(12) United States Patent
Ozawa et al.

(10) Patent No.: US 8,488,221 B2
(45) Date of Patent: Jul. 16, 2013

(54) PRINTING DEVICE FOR PRINTING IMAGES WITH INK AND PRINTING METHOD FOR THE SAME

(75) Inventors: Nao Ozawa, Nagano-ken (JP); Susumu Murayama, Nagano-ken (JP); Seishin Yoshida, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1682 days.

(21) Appl. No.: 11/385,838

(22) Filed: Mar. 22, 2006

(65) Prior Publication Data

US 2006/0238834 A1    Oct. 26, 2006

(30) Foreign Application Priority Data

Mar. 22, 2005  (JP) ................. 2005-081204

(51) Int. Cl.
*G03F 3/08* (2006.01)
*G06K 9/00* (2006.01)
*G09G 3/36* (2006.01)

(52) U.S. Cl.
USPC ............ 358/521; 358/1.9; 358/2.1; 358/3.01; 358/3.02; 382/169; 345/87; 345/89

(58) Field of Classification Search
USPC ............... 358/521, 1.9, 2.1, 2.99, 3.01, 3.02, 358/3.1, 51, 514–516, 518, 519, 461, 448, 358/474; 382/164, 167, 169, 171, 214, 237, 382/274, 277, 278, 279; 345/1.2, 3.3, 87, 345/100, 204, 569, 581, 593, 600, 690
See application file for complete search history.

(56) References Cited

U.S. PATENT DOCUMENTS

| 6,151,410 | A  | * | 11/2000 | Kuwata et al. | 382/167 |
|-----------|----|----|---------|---------------|---------|
| 6,229,916 | B1 | * | 5/2001  | Ohkubo        | 382/167 |
| 6,694,052 | B1 | * | 2/2004  | Matama        | 382/169 |
| 6,694,054 | B1 | * | 2/2004  | Gardes et al. | 382/181 |
| 7,158,107 | B2 | * | 1/2007  | Kawabe et al. | 345/89  |
| 7,639,390 | B2 | * | 12/2009 | Yamada et al. | 358/1.9 |
| 2005/0174586 | A1 | * | 8/2005 | Yoshida et al. | 358/1.9 |

FOREIGN PATENT DOCUMENTS

JP    7-79356 A    3/1995

* cited by examiner

*Primary Examiner* — Steven Kau

(57) ABSTRACT

Display image data for displaying images on a screen, and when display image data that has undergone specified gradation conversion is received, the characteristics of the output brightness displayed on the screen is checked. In the area for which the output brightness of the display image data is convex at the bottom in relation to the image data gradation values, the display image data gradation values are corrected so as to have a roughly linear relationship between the gradation values and the output brightness. Printing image data is generated based on the post-correction image data and an image is printed. In the area for which the output brightness bottom is convex, by performing this kind of correction, it is possible to print an image with an impression closer to the display on the screen. As a result, it is possible to print images on the monitor screen easily and without losing the impression received from the image displayed on the monitor screen.

5 Claims, 18 Drawing Sheets

PRINTING DEVICE FOR PRINTING IMAGES WITH INK AND PRINTING METHOD FOR THE SAME

CLAIM OF PRIORITY

The present application claims priority from Japanese application P2005-81204A filed on Mar. 22, 2005, the content of which is hereby incorporated by reference into this application.

BACKGROUND

1. Field of the Invention

The present invention relates to processing of images displayed on a screen, particularly to technology for printing images.

2. Description of the Related Art

With advances in so-called digital technology, including computers, images are often handled as digital data (so-called image data). For example, today it is relatively easy to realize the conversion of pictures, photographs, documents, or the like to image data using a scanner, the generation of image data directly using a capture device such as a digital camera, and also the creation of image data on a computer. Since image data itself cannot be recognized as is as images, the image data is displayed on a monitor screen and the image is confirmed on the monitor screen. The image displayed by bright spots on the monitor screen is also printed on a printing medium using ink.

Here, when displaying an image on a monitor screen, rather than the image data being supplied as is to the monitor, it is supplied after suitable gradation conversion is performed. This is because of the following reasons. First, the dynamic range of the bright spots that can be output by the monitor screen does not necessarily have sufficient breadth for the range of gradations that can be used by the image data. Because of this, when the gradation range that can be used by the image data is compressed to a relatively narrow dynamic range of the monitor screen and displayed, the image has no contrast and is lacking in sharpness. Making effective use of the narrow dynamic range of the monitor screen, to display a more natural image, image data is supplied to the monitor after adding the following kinds of corrections. Specifically, the following corrections are implemented on image data.

(1) In the area from low gradations to medium gradations that have a relatively big effect on the visual quality of an image, the contrast of the image data is at least preserved, and if possible, strengthened.

(2) On the other hand, in the very low gradation area and the high gradation area that have little effect on the visual quality, the contrast of the image data is compressed.

By doing this, it is possible to match the overall image dynamic range to the range that can be displayed on the monitor screen without losing the visual quality of the image. This kind of gradation characteristics correction is performed as a part of the process called so-called gamma correction, and by changing the gamma value that is the correction parameter, it is possible to make various settings for the contrast compression level in the low gradation area and the high gradation area.

In this way, for the image data supplied to the monitor, the gradation characteristics are corrected as represented in the so-called gamma correction, and since the image data has the contrast adjusted, when printing an image displayed on a monitor screen, a prerequisite is to print an image for which the image data has the contrast adjusted in the same way.

Also, when a plurality of monitors are connected to a host computer, and the gamma value set to each monitor is different, the contrast adjustment level is different according to which monitor the image is displayed on, so proposed is a technology which, by identifying the monitor on which the image is displayed and detecting the gamma value used with that monitor, adds a suitable gamma correction according to the monitor (see JP-A-7-79356).

However, despite the fact that printing was done using image data with the contrast shifted to be exactly the same as the image data displayed on the monitor screen, there was the problem that the actual printed image sometimes was an image that gave a different impression from the image displayed on the monitor screen.

SUMMARY

The present invention was created to address at least part of the problems described above that the prior art has, and the purpose of the invention is to provide technology that makes it possible to print the image displayed on a monitor screen while maintaining the impression as is.

To address at least part of the problems described above, the firs aspect of the image processing device that generates printing image data used for printing images with ink, the device comprises:

a display image data receiving unit that receives display image data for displaying an image of specified gradation values on a screen using bright spots;

a gradation range detection unit that analyzes a relationship between the gradation value of the display image data and an output brightness defined as a brightness of an image displayed on the screen based on the display image data, and detects a range that the output brightness is smaller than that in direct proportion to the gradation value of the display image data; and a printing image data generating unit that, in the detected range, by shifting the gradation value of the display image data so as to have a linear relationship between the gradation value and the output brightness, generates printing image data from the display image data.

Also, the first aspect of the image processing method corresponding to the image processing device noted above is comprised:

receiving display image data that displays images of a specified gradation values on the screen using bright spots, analyzing a relationship between the gradation value of the display image data and an output brightness defined as a brightness of an image displayed on the screen based on the display image data;

detecting a range that the output brightness is smaller than that in direct proportion to the gradation value of the display image data; and generating printing image data from the display image data, in the detected range, by shifting the gradation value of the display image data so as to have a linear relationship between the gradation value and the output brightness.

For the concerned image processing device and image processing method, when the display image data for displaying the image on the screen is received, the printing image data is generated by performing the following kind of gradation correction on the display image data. Specifically, using the display image data gradation value and the display image data that has the gradation value, the gradation range is detected, and the display image data gradation value is shifted so that this gradation area has a roughly linear relationship between the gradation value and the output brightness.

The display image data is image data for which a specified gradation conversion has been implemented to display the image on the screen, so the printing image data generated by further adding gradation correction to the display image data already has undergone gradation conversion that is different from the specified gradation conversion performed to display the image on the screen. Therefore, generally, even when printing an image using this kind of image data, it is not possible to print the image displayed on the screen as is with the impression preserved as is. However, in the gradation area noted above, if the gradation value of the display image data is corrected so as to have a roughly linear relationship between the gradation value and the output brightness, it was discovered that it is possible to obtain a printed image with an impression closer to the image displayed on the screen than when printing with the display image data left unchanged. In fact, this kind of gradation conversion can be implemented easily.

Using the gradation value of the display image data as the horizontal axis, and the output brightness displayed on the screen by that display image data as the vertical axis, when representing the change in output brightness in relation to the display image data, it is also possible to detect the gradation area noted above as the area for which the bottom is convex for the graph representing this change.

For this kind of image processing, when the correlation between the display image data gradation value and the printing image data gradation value is stored in advance, and the display image data is received, it is possible to generate the printing image data by correcting this display image data gradation value based on the concerned correlation.

If the display image data gradation values are corrected based on a correlation stored in advance in this way, it is possible to generate the printing image data easily. Also, if suitable correlations are stored in advance, it is possible to generate suitable printing image data from the display image data, so as a result, it is possible to rapidly output a printing image with the impression of the image displayed on the screen kept as is.

Also, it is easy to constitute a printing device using this kind of image processing device, and to constitute a printing method using the image processing method. In this case, a printing mechanism for printing images using a plurality of types of inks of mutually different hues is prepared, and in addition to correcting the display image data gradation values, by converting the corrected display image data to image data expressed by gradation values for each ink type, printing image data is generated, printing mechanism is driven using this, and printing is performed.

By doing this, not only when printing single color images using single color inks, but also with printing devices that print images using a plurality of types of ink of mutually different hues, it is possible to print the image displayed on the screen with the impression kept as is.

Also, typically, different colorimetric systems are used for the calorimetric system for displaying images on the screen and the calorimetric system for printing, and conversion of the concerned colorimetric systems is performed by referencing a conversion table for which image data of a first calorimetric system and image data of a second calorimetric system are correlated. If we focus on the point whereby the concerned conversion table is used to convert the image data for displaying images on the screen to image data for printing the image, it is possible to understand the invention of this application as a method for generating the following kind of conversion table.

Specifically, the method that generates a conversion table for which the image data according to a first colorimetric system for displaying images on a screen and image data according to a second calorimetric system for printing the images are correlated and stored, and that is referenced to convert display image data according to the first calorimetric system for which specified gradation conversion has been performed to display the images on the screen to image data of the second colorimetric system, the method comprises:

a first step that sets a plurality of image data of the first calorimetric system stored in the conversion table;

a second step that generates converted image data by converting the gradation values of the set first calorimetric system image data; and a third step that, after color converting the converted image data according to the first colorimetric system to image data according to the second colorimetric system, correlates the obtained second calorimetric system image data to the set first colorimetric system image data and stores the obtained second calorimetric system image data in the conversion table;

and the second step including:

analyzing a relationship between the gradation value of the display image data and an output brightness defined as a brightness of an image displayed on the screen based on the display image data, and detects a range that the output brightness is smaller than that in direct proportion to the gradation value of the display image data; and generating printing image data from the display image data, in the detected range, by shifting the gradation value of the display image data so as to have a linear relationship between the gradation value and the output brightness.

If the colorimetric system references the conversion table for conversion, it is possible not only to simply convert the colorimetric system, but also to obtain printing image data for which the calorimetric system has been converted in a state with the gradation value of the display image data suitably corrected as follows. Specifically, in the gradation range for which the output brightness displayed on the screen has the relationship noted above in relation to the gradation value of the display image data, the gradation value of the display image data is shifted so as to have a roughly linear relationship between the gradation value and the output brightness, after which it is possible to obtain printing image data for which the colorimetric system has been converted from the first calorimetric system to the second calorimetric system. If an image is printed based on printing image data obtained in this manner, it is possible to print an image while keeping unchanged the impression of the image displayed on the screen. In addition, if the display image data is converted to the printing image data by referencing this kind of conversion table, it is possible to implement the process of correcting the display image data gradation value and the process of converting the colorimetric system with a one time process, so it is possible to print images easily and rapidly.

Furthermore, the present invention can also be realized as program products realized using a computer by reading a program for realizing the printing method or image processing method noted above into a computer, and executing specified functions.

With these program products, if each of the various functions are realized by reading program codes into the computer, it is possible to print the image displayed on the monitor screen with the impression kept as is and also to do this easily.

DESCRIPTION OF THE PREFERRED EMBODIMENTS

Figure 1:
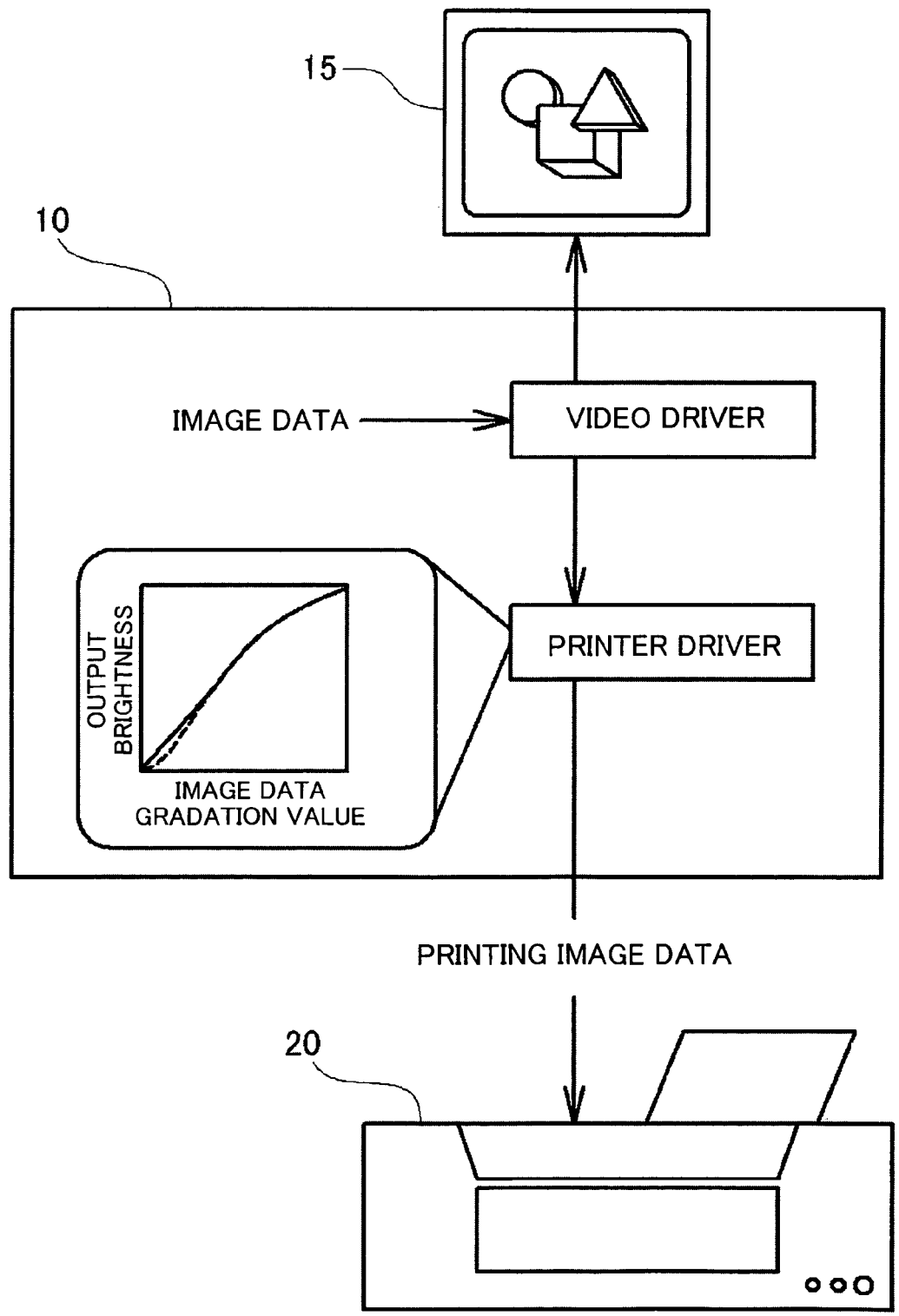
FIG. 1 is an explanatory drawing showing an overview of this embodiment

Following are described embodiments in the following order to clarify the contents of the invention of this application described above.
A. Summary of the Embodiments:
B. Device Constitution:
C. Image Display Process:
D. Display Image Printing Process of the First Embodiment:
E. Display Image Printing Process of the Second Embodiment:
F. Variation Examples:
A. Summary of the Embodiments:

Before starting the detailed description of the embodiment, a summary of the embodiment is described while referring to FIG. 1. FIG. 1 is an explanatory drawing that uses an example of a printing system showing a summary of this embodiment. The printing system in the drawing consists of a computer 10 and a printer 20, all of which makes a single unit that functions as a printing device. Also, a monitor 15 is connected to the computer 10, and before supplying image data to the printer 20 and printing the image, it is possible to confirm the image by displaying it on the monitor 15. Alternatively, when creating an image using application software on the computer 10, the image is created while confirming it on the monitor 15, when necessary the image data is supplied to the printer 20, and it is also possible to print a finished image.

Here, as the monitor 15, it is possible to use any apparatus as long as it is an item that is able to display the image data in a visually recognizable state, such as a CRT (Cathode Ray Tube) used widely in the past, a liquid crystal monitor, a plasma method monitor, and various types of projectors or the like. Originally, almost all of these apparatus do not have a sufficiently wide displayable brightness range (dynamic range) compared to the gradation range that can be taken with the image data, but rather, because of this, with the image data displayed on the monitor as is, the overall contrast is compressed, and the image is not sharp. In light of this, so as to be able to obtain a natural image even when displayed on the monitor 15, and after implementing gradation conversion on the image data such as compressing the contrast in the gradation area for which the effect on the visual quality is relatively small (very low gradation area and high gradation area), and at least retaining or in some cases strengthening the contrast in the gradation area which has a large effect on the visual quality (low gradation area to middle gradation area), display is done on the monitor 15. Also, depending on the various settings of the monitor 15 and the method of displaying the image, there are cases when the displayable dynamic range on the monitor 15 differs, and in such a case, suitable gradation conversion for each monitor is performed on the image data. The process of performing this kind of gradation conversion on the image data and supplying it to the monitor 15 is performed by a dedicated program (or dedicated circuit) called a video driver provided within the computer 10.

In this way, the image displayed on the monitor 15 becomes an image for which the contrast is adjusted by implementation of the gradation conversion, so when an attempt is made to print with the image displayed on the monitor 15 in an unrevised state, image data which has undergone gradation conversion for suitable display on the monitor 15 (display image data) is received from the video driver, or display image data is generated by implementing the same kind of gradation conversion as the video driver on the image data, and a specified conversion is implemented on that image data to print the image. An image is printed by supplying the printing image data obtained in this way to the printer 20. The series of conversions performed to generate the printing image data is performed by a dedicated program (or dedicated circuit) called the printer driver provided within the computer 10.

Here, when the display image data is received by the printer driver of this embodiment, further specified gradation conversion is performed on this image data. The state of performing the gradation conversion on the display image data is shown in the graph that is conceptually shown in FIG. 1. The curve shown by the dotted line in the graph shows an example of the contrast of the image expressed by the display image data.

With this embodiment, by performing further gradation conversion on this display image data, this is converted to image data having the kind of contrast shown by example with the solid line. The detailed contents of the gradation conversion (what kind of gradation area undergoes what kind of gradation conversion) will be described in detail later. By performing specified conversion for printing an image on the image data for which the contrast was changed in this way, the printing image data is generated and the image is printed. Of course, if the contrast of the display image data is changed, this will be different from the contrast of the image displayed in the monitor. However, regardless of that, it is possible to print an image with a closer impression to the image displayed on the monitor than when printing an image with the contrast displayed on the monitor left as is. In this way, there are various methods for the method of printing an image in a state with the contrast converted by performing gradation conversion on the display image data. Following, these various methods are described in detail based on the embodiments.

Figure 2:
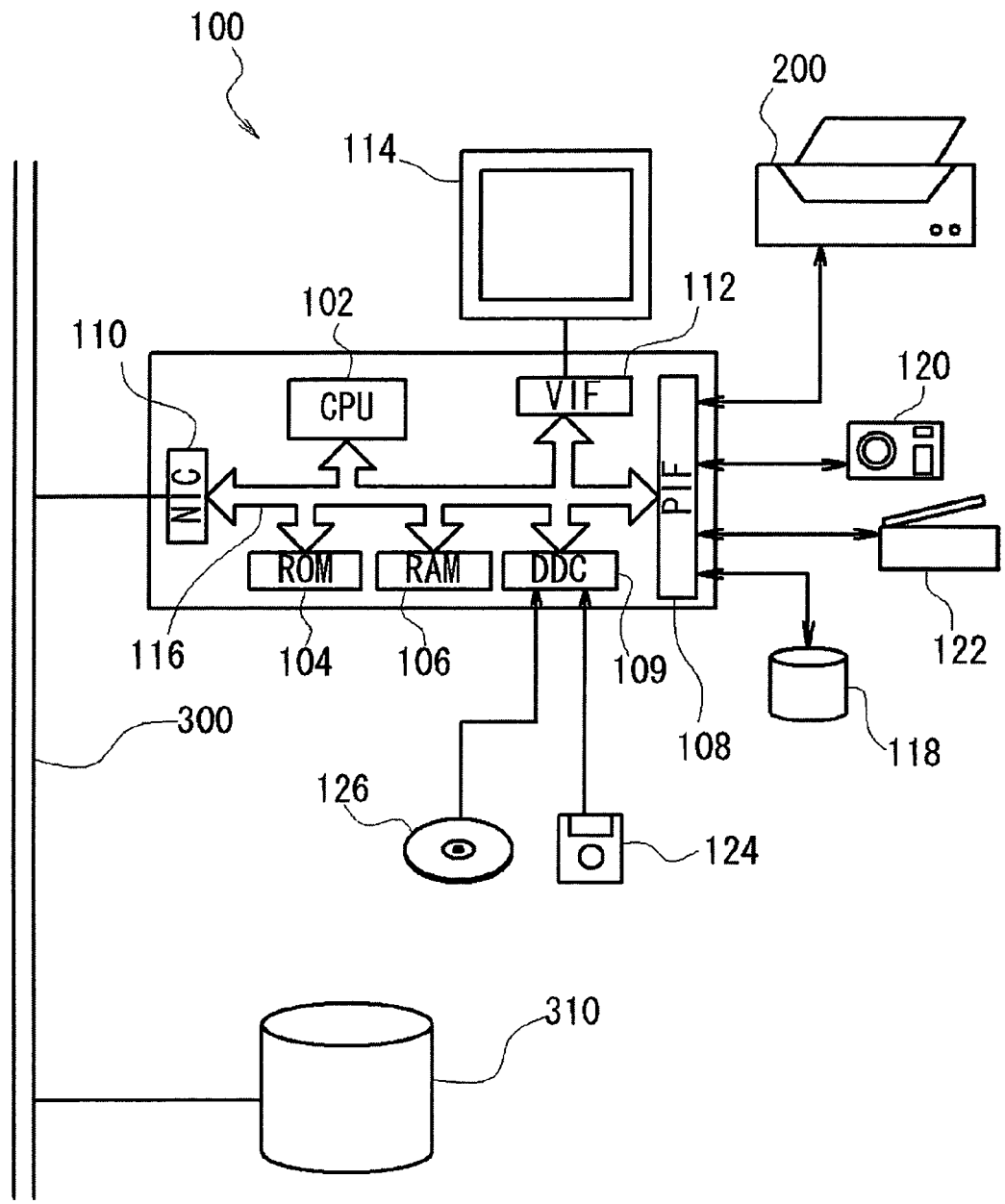
FIG. 2 is an explanatory drawing showing the constitution of a computer that performs image data conversion.

B. Device Constitution:

FIG. 2 is an explanatory drawing showing the constitution of the computer 100 that generates the display image data with the addition of gradation conversion to the image data or that generates printing image data for printing images from the display image data. The computer 100 has connected to it a disk controller DDC 109 for reading data from a flexible disk 124 or a compact disk 126 or the like, a peripheral device interface PIF 108 used for performing sending and receiving of data with the peripheral devices, a video interface VIF 112 for driving the monitor 114, and the like. Connected to the PIF 108 are the hard disk 118, the color printer 200 described later, and the like. Also, if a digital camera 120 or a color scanner 122 or the like is connected to the PIF 108, it is possible to print the images taken by the digital camera 120 or the color scanner 122.

Also, if a network interface card NIC 110 is mounted, the computer 100 is connected to a communication line 300, the data stored in a storage device 310 connected to the communication line can be fetched and printed from the color printer 200, or a fetched program can be moved.

Figure 3:
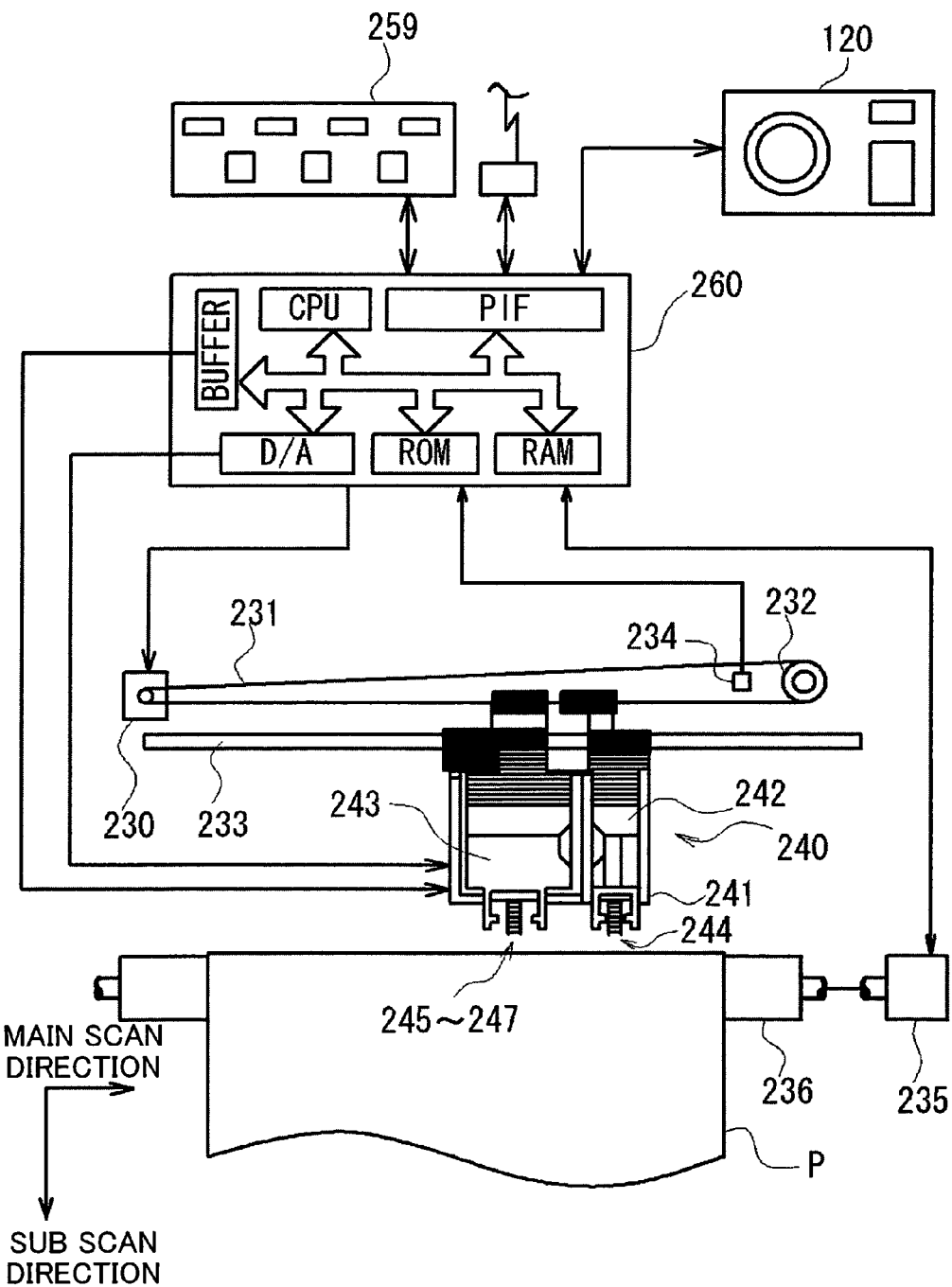
FIG. 3 is an explanatory drawing showing the schematic structure of a color printer.

FIG. 3 is an explanatory drawing showing the schematic structure of the color printer 200 that prints images on printing paper. The color printer 200 includes four colors of inks of cyan, magenta, yellow, and black, and this is an inkjet printer capable of forming four colors of ink dots using each of the inks. Also, in addition to these four colors of inks, it is also possible to include other inks such as light cyan ink which has a low concentration of cyan dye or pigment, and light magenta ink which has a low concentration of magenta dye or pigment, and to form dots using these inks. Moreover, following, as necessary, the cyan ink, magenta ink, yellow ink, black ink, light cyan ink, and light magenta ink may sometimes be abbreviated respectively as C ink, M ink, Y ink, K ink, LC ink, and LM ink. Also, following, images are described as items printed using solely inkjet printers, but of course this is not limited to inkjet printers, and it is also possible to similarly apply this to printers that print images using a different method such as laser printers that print images using each color toner, or that add heat to the ink sheet and move the ink onto the printing paper by sublimation, or that add physical force to the ink sheet to transfer the ink onto the printing paper or the like.

As shown in the drawing, the color printer 200 consists of a mechanism that drives a printing head 241 on a carriage 240 and performs ink spraying and dot formation, a mechanism that moves this carriage 240 back and forth in the axis direction of a platen 236 by a carriage motor 230, a mechanism that transports printing paper P by a paper feed motor 235, a control circuit 260 that controls the formation of dots, the moving of the carriage 240, and the transport of the printing paper, or the like.

Mounted on the carriage 240 are an ink cartridge 242 that houses the K ink and an ink cartridge 243 that houses the various inks including the C ink, the M ink, and the Y ink. When the ink cartridges 242 and 243 are mounted on the carriage 240, each ink within the cartridge passes through an introduction tube (not illustrated) and is supplied to each color ink spray head 244 through 247 provided on the bottom surface of the printing head 241. Each color ink spray head 244 through 247 forms ink dots on the printing medium by spraying ink drops using ink supplied in this way. Moreover, with the color printer 200 shown in FIG. 3, described was a printer for which the C ink, M ink, and Y ink are all housed as one unit in one ink cartridge 243, but it is also possible to house each of these inks in separately formed dedicated ink cartridges.

The control circuit 260 consists of, with a CPU as its core, a ROM, RAM, peripheral equipment interface PIF and the like, and in addition, a D/A converter or the like that converts digital data to analog signals. Of course, it is also possible not to include a CPU, and to realize the same functions using hardware or firmware. The control circuit 260 performs control of the main scan operation and the sub scan operation of the carriage motor 230 by controlling the operation of the carriage motor 230 and the paper feed motor 235. Also, ink drops are sprayed by driving the printing head 241 at a suitable timing to match the main scan and sub scan of the carriage 240. In this way, under the control of the control circuit 260, each color ink drops are sprayed at a suitable timing from each color ink spray heads 244 through 247, and as a result, ink dots of each color are formed with a suitable distribution on the printing paper P, to print a color image.

Moreover, it is possible to use various methods for the method of spraying ink drops from each color ink spray head. Specifically, it is possible to use a method of spraying ink using a piezo element, or a method of spraying ink drops by generating bubbles within the ink path using a heater placed in the ink path. Also, instead of spraying ink, it is also possible to use a printer that uses a method of forming ink dots on printing paper using a phenomenon such as heat transfer or the like, or a method of forming dots by adhering each color toner powder onto the printing paper using static electricity.

Figure 4:
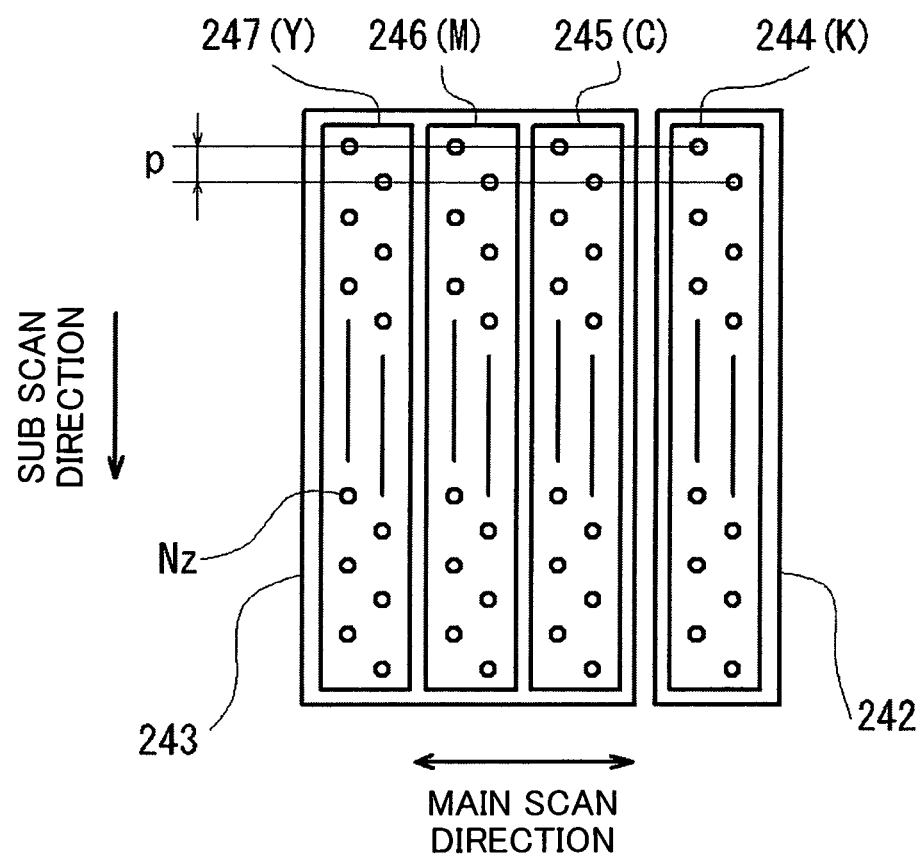
FIG. 4 is an explanatory drawing showing the status of the formation of a plurality of nozzles that spray ink drops on the bottom surface of an ink spraying head.

FIG. 4 is an explanatory drawing showing the state of a plurality of nozzles Nz that spray ink drops formed on the bottom surface of each color ink spray heads 244 through 247. As shown in the drawing, four sets of nozzle rows that spray each color ink drops are formed on the bottom surface of each color ink spray head, and on one set of nozzle rows are arranged 48 nozzles Nz in zigzag form with intervals of nozzle pitch p open. These nozzles are driven under the control of the control circuit 260 and ink dots are formed on the printing paper by spraying ink drops.

The color printer 200 having the kind of hardware constitution noted above has each color ink spray heads 244 through 249 [sic: 247?] move in the main scan direction to the printing paper P by driving the carriage motor 230, and has the printing paper P move in the sub scan direction by driving the paper feed motor 235. The control circuit 260 drives the nozzles at a suitable timing and sprays ink drops while repeating the main scan and the sub scan of the carriage 240.

By doing this, ink dots are formed at suitable positions on the printing paper P, and as a result, an image is printed.

Also, with a constitution whereby the computer 100 and the color printer 200 are connected as described above, it is possible for the image displayed on the monitor 114 of the computer 100 to be frequently printed from the color printer 200. Of course, the image of the monitor 114 is also an item displayed based on the image data originally within the computer 100, so if the image data within the computer 100 is used, then it is possible to print the image displayed on the monitor 114 from the color printer 200. However, the image displayed on the monitor 114 is an image for which the contrast is adjusted so as to be seen as a natural image on the monitor 114. Therefore, when printing using the color printer 200 as well, if the same contrast adjustment is not performed, the image will have a large difference in impression from the image displayed on the monitor 114. Specifically, when printing the image displayed on the monitor 114, after performing the same contrast adjustment as when displaying on the monitor 114, it is necessary to perform a series of conversions on the obtained image data to print the image. Following, a detailed description is given of the series of processes for printing the image displayed on the monitor 114, but as preparation for this, first, described is the process for displaying on the monitor 114 after adjusting the contrast of the image data.

Figure 5:
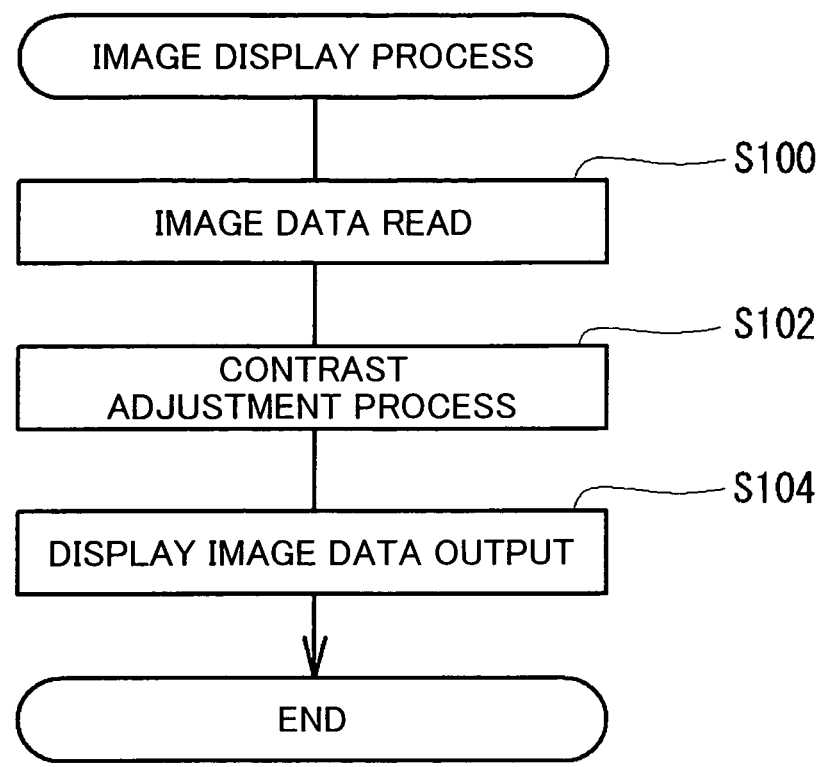
FIG. 5 is a flow chart showing the flow of the image display process performed to display an image on a monitor.

C. Image Display Process:

FIG. 5 is a flow chart showing the flow of the process (image display process) for the computer 100 to perform display of the image on the monitor 114. This process is a process executed by the CPU 102 as the focus, and the RAM 106, the VIF 112, and the like incorporated in the computer 100. Following, this is described according to the flow chart.

When the image display process starts, the CPU 102 of the computer 100 fetches the image data of the image to be displayed on the monitor 114, and stores it in a specified area of the RAM 106 (step S100).

Next, the process of adjusting the contrast is performed on this image data (step S102). This contrast adjustment process is the following kind of process. First, the monitor 114 can have the screen luminosity (brightness) changed, and it is possible to display images by changing the brightness of each pixel. Here, there is a limit to the range of brightness that can be displayed by the monitor 114, and compared to the gradation range that can be taken by the image data, it does not have sufficient dynamic range. Because of this, if the gradation range that can be taken by the image data is simply allocated to a relatively narrow brightness range that can be displayed on the monitor 114, specifically, a range from the minimum to maximum brightness, the overall image contrast will be compressed, and the image will not be sharp.

Figure 6:
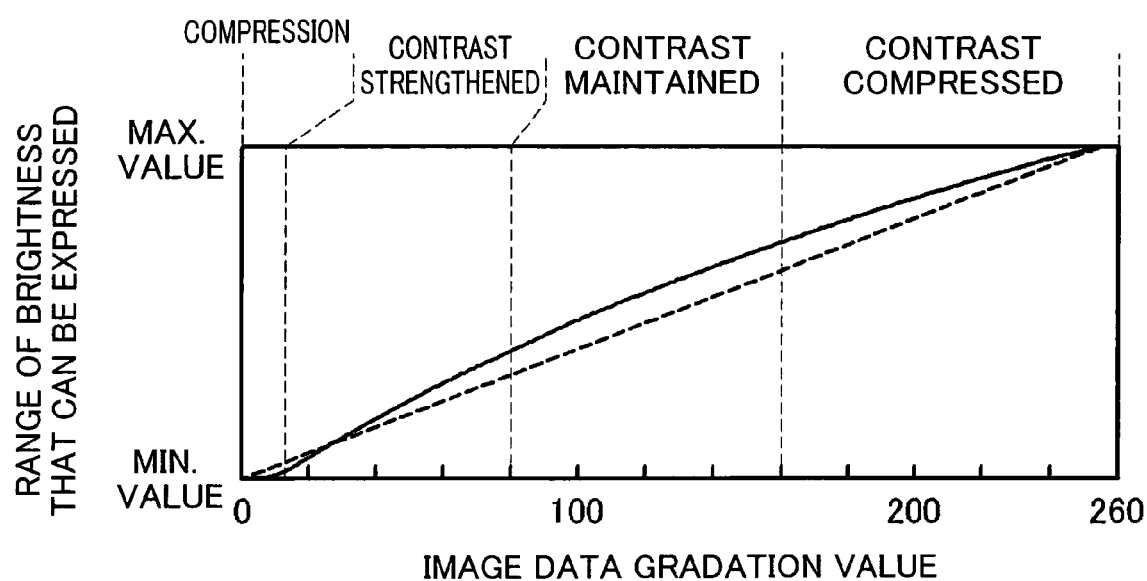
FIG. 6 is an explanatory drawing showing the status of adjusting the contrast of the image data to display on a monitor.

FIG. 6 is an explanatory drawing showing the state of adjusting the image data contrast before displaying on the monitor. With FIG. 6, the gradation value of the image data is shown in the horizontal axis, and the brightness that can be expressed with the monitor is shown in the vertical axis. Also, the dotted line shown in the drawing shows a case when there is equal allocation of the gradation range that can be taken by the image data to the range of the minimum brightness value and maximum brightness value that can be displayed by the monitor 114. As is conceptually shown in FIG. 6, the range of brightness that can be displayed on the monitor 114 (vertical axis in FIG. 6) is narrower than the gradation range that can be taken by the image data (horizontal axis in FIG. 6), so as shown by the dotted line, if the brightness is made to increase linearly as the image data increases, the image displayed in the monitor 114 has its contrast compressed and as a result is not a sharp image. In light of this, so that the brightness of the monitor 114 is a value shown by the solid line in relation to the image data, the correlation of the image data gradation value and the monitor 114 brightness is changed.

As is clear from comparing the solid line and the dotted line shown in FIG. 6, with image data with a very small value gradation area (the area for which the gradation value is approximately 10 or less in the example shown in the drawing), the brightness of the monitor 114 does not increase that much even when the image data gradation value increases. Similarly, even with image data with a relatively large value gradation area (the area for which the gradation value is approximately 160 or greater with the example shown in the drawing), the brightness of the monitor 114 does not increase as much as the increase in the image data gradation value. Therefore, with these gradation areas, the contrast of the image is compressed more than with the correlation shown by the dotted line in FIG. 6. Meanwhile, with the area from the low gradations to the medium gradations (the area for which the gradation value is approximately 10 to 80 in the example in the drawing), there is a bigger increase in the brightness with the solid line than the dotted line. Therefore, with this area, the correlation shown by the solid line in the drawing has stronger contrast of the image than the correlation shown by the dotted line. Also, with the medium gradation area (the area for which the gradation value is approximately 80 to 160 in the example in the drawing), the brightness increases approximately the same with the correlation shown by the solid line and the correlation shown by the dotted line. Therefore, with this area, the contrast of the correlation shown by the dotted line is maintained.

Generally, the image data very low gradation area and high gradation area parts do not have, that big an effect on the visual quality of the image, and there is a tendency for the low gradation area and medium gradation area parts to have a big effect on the visual quality of the image. Therefore, as shown by the solid line in FIG. 6, the contrast is strengthened or maintained with the low gradation area and medium gradation area that have a big effect on the visual quality, and with the very low gradation area and the high gradation area which have a small effect on visual quality, if the contrast is compressed, it is possible to effectively use the brightness range that can be expressed by the monitor 114, and to display a natural image with a suitable level of sharpness with the contrast adjustment process shown in FIG. 5 (step S102), to display a natural image on the monitor 114 in this way, the process of adjusting the contrast of the image data is performed.

Figure 7:
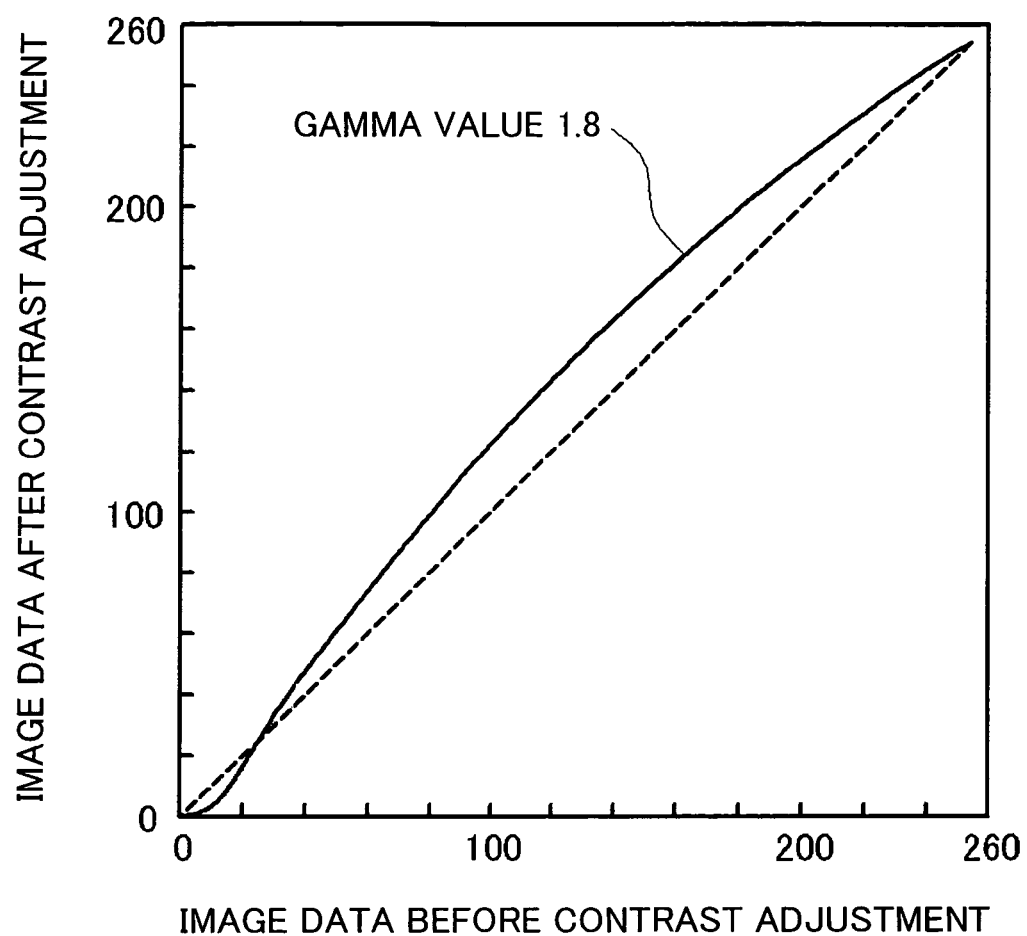
FIG. 7 is an explanatory drawing conceptually showing the gradation characteristics conversion table referenced to adjust the contrast.

Actually, the contrast adjustment is performed by converting the gradation values of image data stored in a specified area on the RAM 106 read previously. FIG. 7 is an explanatory drawing that conceptually shows the gradation characteristics conversion table referenced to convert the image data gradation values. As shown in the drawing, a gradation characteristics conversion curve that correlates the image data gradation values before contrast adjustment and the image data gradation values after contrast adjustment is set in the conversion table. Therefore, if the image data gradation values are converted based on the gradation characteristics conversion curve set in the conversion table of FIG. 7, it is possible to obtain image data for which the contrast has been adjusted. Specifically, if the image data is converted according to the gradation characteristics conversion curve shown in FIG. 7, for example in the very low gradation area, the image data after conversion does not change to the level that the image data before conversion changes. Because of that, when the post-conversion image data is displayed on the monitor 114, the change in brightness on the monitor 114 also changes, and the image contrast is compressed. Also, with the low gradation area, because the post-conversion image data changes more than the pre-conversion image data changes, the change in brightness on the monitor 114 is greater, and the image contrast is strengthened. Similarly, with the medium gradation area, the image contrast is maintained, and with the high gradation area, the image contrast is compressed.

Moreover, the level at which the image contrast is compressed or strengthened in this way (said another way, the form of the gradation characteristics conversion curve shown in FIG. 7) differs according to the brightness range that can be expressed on the monitor 114. Also, when the brightness characteristics output to the image data by the monitor are not in linear form, to correct this, the image contrast may also be adjusted for convenience. This kind of correction is generally called gamma correction, and the level of correction can be set by parameters called gamma values. Specifically, the bigger the gamma value, the smaller the level of contrast adjustment, and the smaller the gamma value, the greater the level of contrast adjustment. The gradation characteristics conversion curve shown in FIG. 7 expresses the case when the contrast is adjusted with the gamma value set at 1.8.

At step S102 of the image display process shown in FIG. 5, the image data read at step S100 has the contrast adjusted by performing gradation conversion while referencing the gradation characteristics conversion curve shown in FIG. 7, and performs the process of writing the adjusted image data to exclusive memory called a frame buffer. Moreover, with this embodiment, the image data for which the contrast is adjusted in this way is called "display image data."

Once the display image data is written to the frame buffer in this way, the display image data is read from the frame buffer, and after performing suitable conversion to match the specifications of the monitor 114, in turn, the process of outputting to the monitor 114 is performed (step S104), and the image display process shown in FIG. 5 ends.

Figure 8:
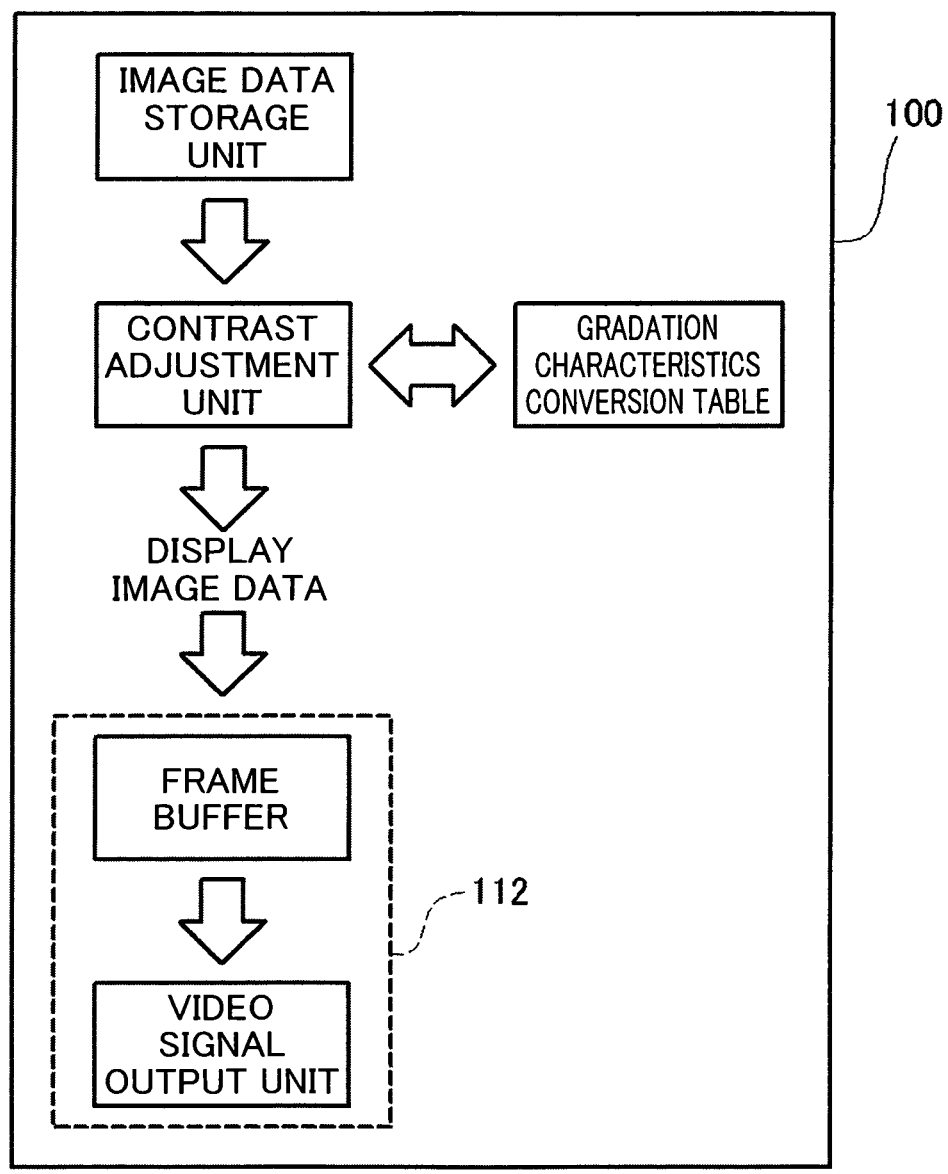
FIG. 8 is a block diagram conceptually showing the status of the image display process beings executed within the computer.

FIG. 8 is a block diagram that conceptually shows the state of the series of image display processes described above being performed inside the computer 100. The image data read at step S100 of the image display process is stored in the "image data storage unit." This image data storage unit is mainly realized by the RAM 106 and the CPU 102. Next, the gradation value of the image data stored in the image data storage unit is converted using the "contrast adjustment unit," and the display image data is generated. The contrast adjustment unit is realized using the CPU 102 and the RAM 106 in which is set the gradation characteristics conversion table shown in FIG. 7. The display image data generated in this way is stored once in the frame buffer provided within the video interface VIF 112, after which it is read by the "video signal output unit," and is output to the monitor 114. The display image data supplied to the monitor 114 in this way has the contrast suitably adjusted, and a natural image is displayed on the monitor 114.

D. Display Image Printing Process of the First Embodiment:

Next, described is the display image printing process performed to print the image displayed on the monitor 114 from the color printer 200.

Figure 9:
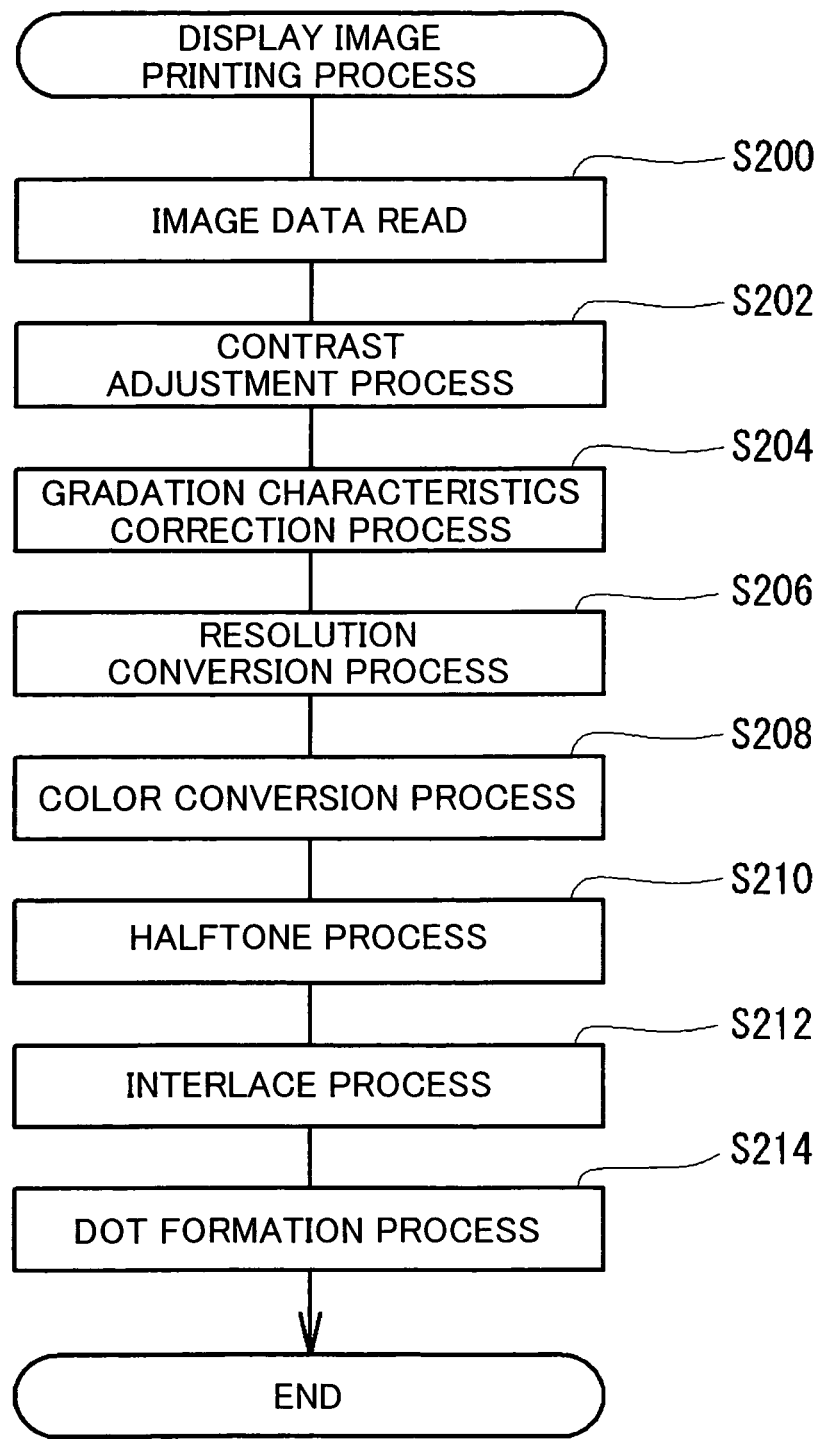
FIG. 9 is a flow chart showing the flow of the display image printing process of the first embodiment.

FIG. 9 is a flow chart that shows the flow of the display image printing process of the first embodiment. This process is a process executed by the CPU 102 incorporated in the computer 100. Following, it is described according to the flow chart.

When the display image printing process of the first embodiment is started, first, the image data to be printed is read (step S200). The image data read at this time is image data for which contrast adjustment performed with the image display process described above has not been performed, in other words, image data created with a digital camera or various types of application programs left unchanged. Also, the read image data, the same as the image data supplied to the monitor 114, is so-called RGB image data described previously with the gradation values for each color of R (red), G (green), and B (blue) corresponding to the primary colors of light.

Next, the same as when displaying images on the monitor 114, the process of adjusting the contrast is performed on the read image data (step S202). Specifically, the image displayed on the monitor 114, as described previously, is an image for which the contrast is adjusted so as to be able to display a natural image by making effective use of the brightness range that can be displayed by the monitor 114. Then, here, since the example has the image displayed on the monitor 114 printed, the image data supplied to the color printer 200 also has to have its contrast adjusted in the same way as the image data used for display on the monitor 114. In light of this, at step S202, the same as with the image display process described above, the contrast adjustment process is performed by converting the image data gradation values according to the gradation characteristics conversion curve shown in FIG. 7.

If the image data contrast is adjusted in the same way as when displaying the image on the monitor 114 in this way, next, the process of correcting the gradation characteristics is started on the image data for which the contrast has been adjusted (specifically, the display image data) (step S204).

Figure 10:
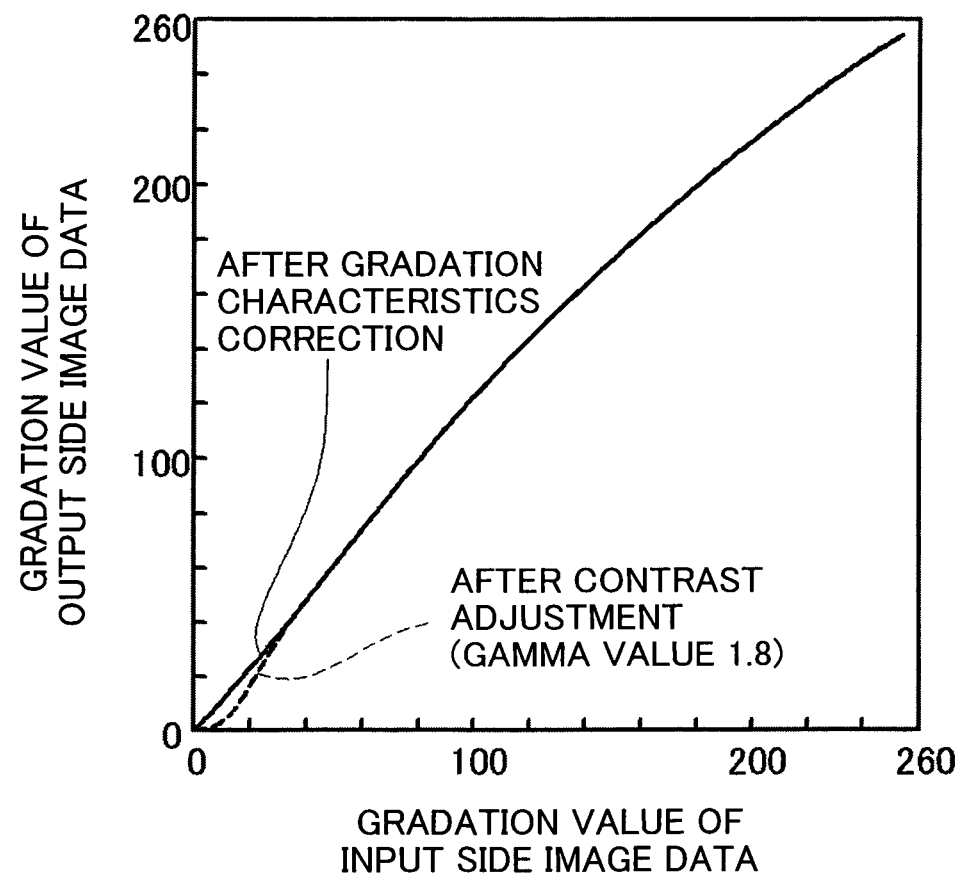
FIG. 10 is an explanatory drawing showing the status of correcting the gradation characteristics of the display image data.

FIG. 10 is an explanatory drawing showing the state of correcting the gradation characteristics of the display image data for which the contrast was adjusted. The dotted line curve shown in the drawing shows the gradation characteristics conversion curve used to generate the display image data with the contrast of the image data adjusted for the contrast adjustment process described previously (FIG. 9, step S202). Moreover, this gradation characteristics conversion curve is the same as the gradation characteristics conversion curve shown in FIG. 7, specifically, the conversion curve used for adjusting the contrast of the image data for displaying on the monitor 114. With the gradation characteristics correction process performed after the contrast adjustment process (FIG. 9, step S204), the process of correcting the gradation characteristics of the display image data is performed so that the image data after correction is the same image data as that obtained by the conversion curve shown by the solid line in FIG. 10. Following, the detailed contents of the correction are described.

As shown by the dotted line in FIG. 10, the gradation characteristics conversion curve for adjusting the contrast of the image data is a conversion curve for which the image data gradation values on the output side shown by the vertical axis increases roughly as the gradation value of the image data on the input side shown by the horizontal axis increases. Also, when looking in detail at the form of this conversion curve, overall there is a convex form at the top, and with the very low gradation area, the bottom has a convex form. In comparison, the part that is convex at the bottom is a part provided corresponding to a compression of the contrast of the very low gradation area for the contrast adjustment process described previously.

With the gradation characteristics correction process, with the part for which the gradation characteristics conversion curve is convex at the bottom, the process of correcting the gradation value of the display image data is performed so that the image data on the input side taken by the horizontal axis of FIG. 10 and the image data of the output side taken by the vertical axis have an approximately linear relationship. As a result, the part that is convex at the bottom are corrected to characteristics such that the gradation value of the image data on the output side shown by the vertical axis increase linearly according to the increase in the gradation value of the image data on the input side shown by the horizontal axis as shown by the solid line in FIG. 10.

Figure 11:
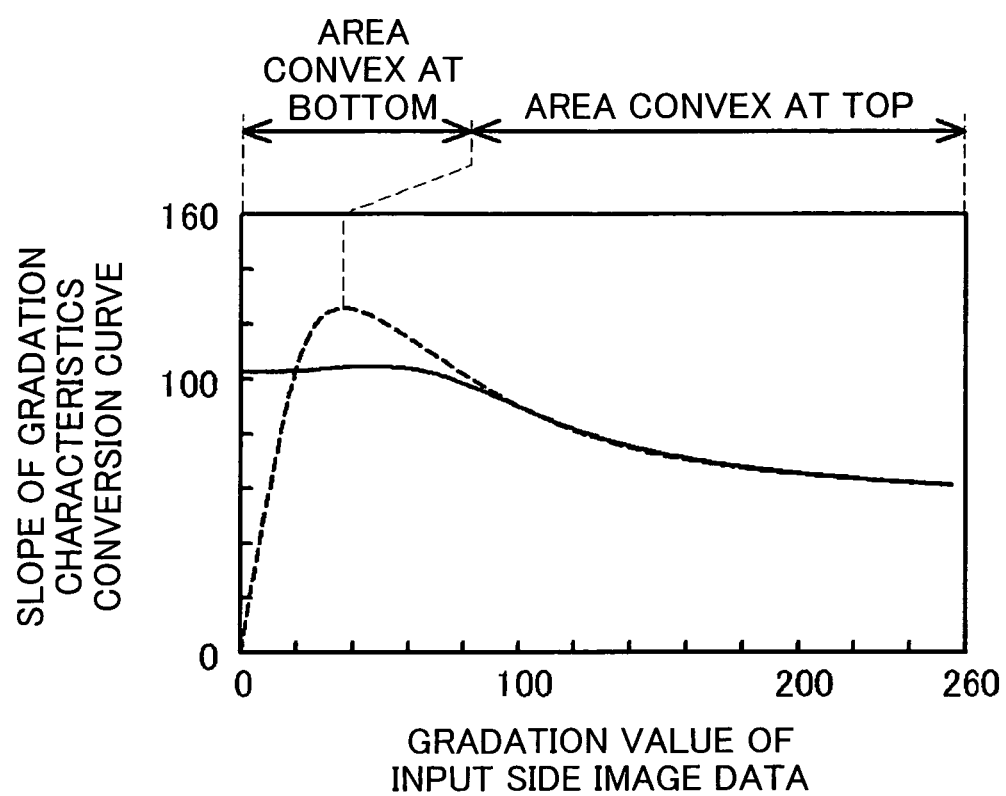
FIG. 11 is an explanatory drawing that compares the derivative values of the gradation characteristics conversion curve and the corrected gradation characteristics conversion curve.

FIG. 11 is an explanatory drawing comparing the curve slope (in other words, the conversion curve derivative value) using the gradation characteristics conversion curve used for adjusting the contrast and the conversion curve obtained by correcting this gradation characteristics conversion curve. What is shown by the dotted line in FIG. 11 is the derivative value of the gradation characteristics conversion curve used to adjust the contrast, and shown by the solid line is the derivative value of the gradation characteristics conversion curve obtained by correction. As shown in FIG. 11, the derivative value of the conversion curve always used the positive value regardless of the image data gradation value, and this corresponds to the post-conversion image data gradation value increasing according to the increase in the image data gradation value on the input side. However, as shown by the dotted line in the drawing, with the area for which the image data gradation value is low (with the example shown in FIG. 11, the area for which the gradation value is lower than about "20"), the derivative value also increases according to an increase in the image data, but when the image data gradation value gets to a certain level and above (with the example shown in FIG. 11, the area for which the gradation value is higher than about "20"), the derivative value decreases according to an increase in the image data. This indicates that for the gradation characteristics conversion curve used for adjusting the contrast, the bottom has a convex form in the low gradation side area, but in the high gradation side area, the top has a convex form.

Meanwhile, the derivative value shown by the solid line in FIG. 11 (specifically, the slope of the conversion curve obtained by correcting the gradation characteristics conversion curve used for adjusting the contrast) has a roughly fixed value in the low gradation side area, and in the high gradation side area, decreases according to an increase in the image data. This indicates that the corrected gradation characteristics conversion curve has a form close to a straight line having a positive slope in the low gradation side area, but has a convex form at the top in the high gradation side area. As described above, the gradation characteristics correction process performed in the display image printing process of FIG. 9 is the process that converts the image data having the gradation characteristics like those shown by the solid line in FIG. 10 by correcting the gradation value of the display image data for which the contrast is adjusted. As will be described later, with the display image printing process of this embodiment, in this way, the image is printed based on image data for which the gradation characteristics of the display image data are further corrected. In light of this, hereafter, the image data generated by implementing gradation characteristics correction processing on the display image data is called "printing image data."

Figure 12:
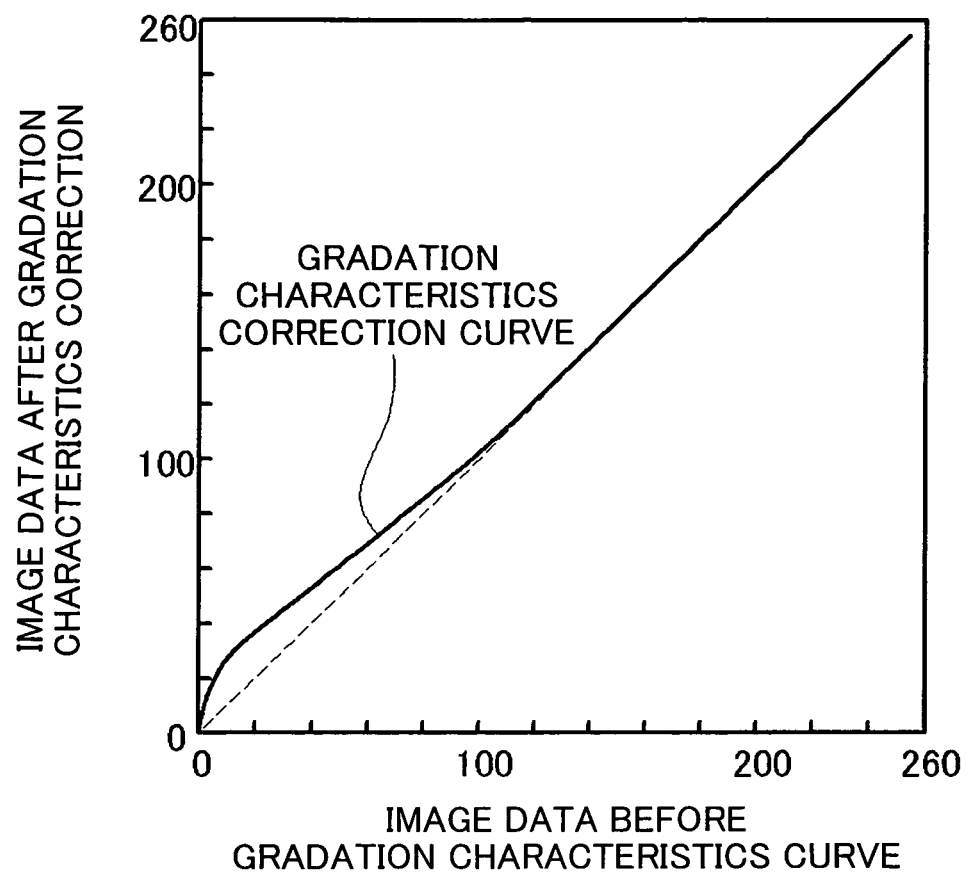
FIG. 12 is an explanatory drawing showing the gradation characteristics correction curve referenced for the gradation characteristics correction process.

This kind of gradation characteristics correction process in fact can be performed easily by converting the gradation value of the display image data for which the contrast is adjusted according to the gradation characteristics correction curve set in advance. FIG. 12 is an explanatory drawing showing the gradation characteristics correction curve referenced with the gradation characteristics correction process. With FIG. 12, the gradation characteristics correction curve is shown with the image data gradation value before gradation characteristics correction shown by the horizontal axis and the image data gradation value after gradation characteristics correction shown by the vertical axis. If the gradation value is corrected according to this kind of correction curve, it is possible to convert the display image data for which the contrast is adjusted to printing image data having the kind of gradation characteristics shown by the solid line in FIG. 10. With step S204 of the display image printing process shown in FIG. 9, the process is performed of correcting the gradation value of the display image data for which the contrast was adjusted at step S202 according to the kind of gradation characteristics correction curve shown in FIG. 12.

If the gradation value of the display image data is corrected to convert to the printing image data as described above, the CPU 102 of the computer 100 starts the resolution conversion process (step S206). The resolution conversion process is the process of converting the image data resolution to the resolution for printing by the color printer 200 (printing resolution). When the image data resolution is lower than the printing resolution, it is converted to a higher resolution by setting new image data by performing interpolation between adjacent pixels. Conversely, when the image data resolution is higher than the printing resolution, this is converted to a lower resolution by culling image data at a fixed percentage from between adjacent pixels. With resolution conversion processing in this way, by image data generation or culling at a suitable percentage for the image data, the process of converting the printing image data resolution to the printing resolution is performed.

When the printing image data resolution is converted to the printing resolution, the CPU 102 of the computer 100 starts the color conversion process (step S208). The color conversion process is the process of converting the RGB color image data expressed by a combination of R, G, and B gradation values to gradation data corresponding to the use volume of each color ink incorporated in the printer. Specifically, as described previously, the read image data is RGB image data for which gradation values are set for each color RGB, and meanwhile, the color printer 200 prints images using the four colors of ink C, M, Y, and K. In light of this, with the color conversion process, the process of converting RGB image data to the gradation data of each color C, M, Y, and K is performed.

Figure 13:
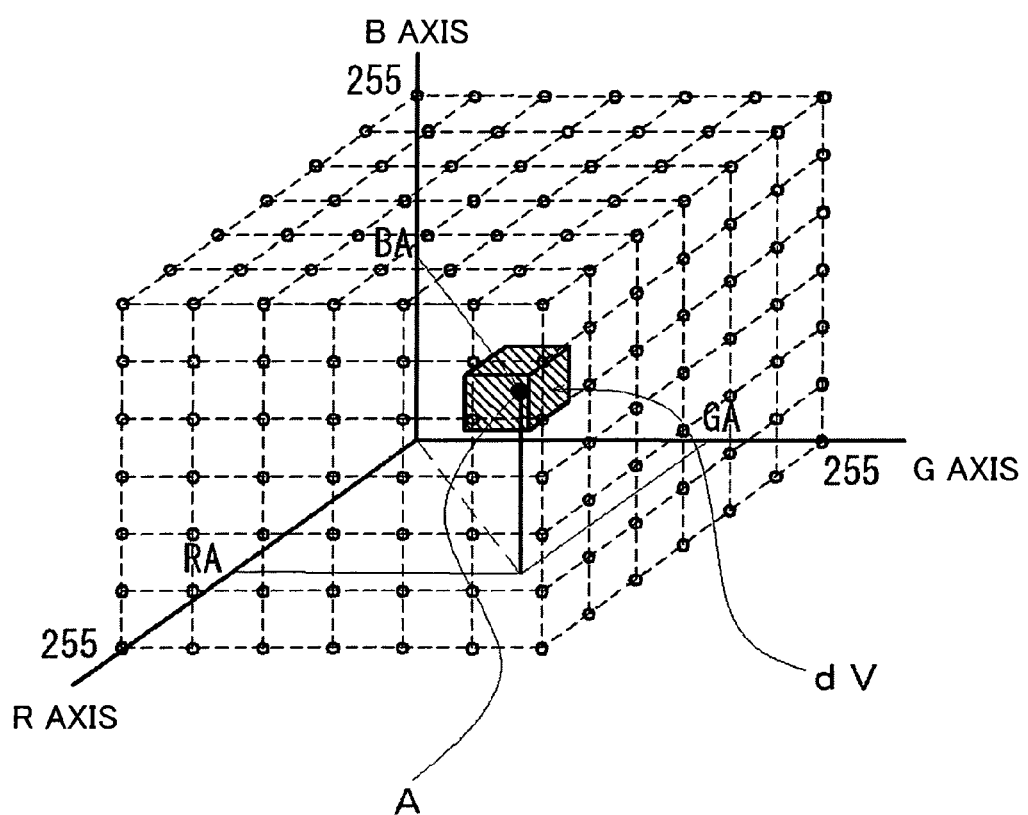
FIG. 13 is an explanatory drawing conceptually showing a color conversion table.

The color conversion process is performed by referencing a three dimensional number chart called a color conversion table (LUT). FIG. 13 is an explanatory drawing that conceptually shows the color conversion table (LUT) referenced for color conversion processing. If it is set that values of 0 to 255 can be obtained for the gradation values of each color RGB, as shown in FIG. 13, if we consider the color space taken for the gradation values of each color R, G, B that are three orthogonal axes, all the RGB image data can be correlated to a point within the cube (color solid) for which the length of one side is 255 with the origin point as the vertex. From this, if the color solid is subdivided into a grid shape with each axis RGB at right angles, it is possible to correlate each grid point to the respective RGB image data. In light of this, for each grid point correlated to the RGB image data in this way, a combination of gradation values for each color C, M, Y, and K is stored in advance. By doing this, when the RGB image data is given, by reading the gradation values stored in the grid points, it is possible to rapidly convert that RGB image data to the gradation data of each color C, M, Y, and K.

For example, with the image data R component as RA, the G component as RG, and the B component as RB, this image data is correlated to point A within the color space (see FIG. 13). In light of this, from within the fine cube for which the color solid is subdivided, the cube dV that includes point A is detected, and the gradation value of each color stored at each grid point of this cube dV is read. Then, if interpolation is done from the gradation values of each of these grid points, it is possible to obtain the gradation value of each color at point A. As described above, the color conversion table LUT can be thought of as a three dimensional number chart for which combinations of the gradation values of each color C, M, Y, and K are stored at each grid point indicated by combinations of the gradation values of each color RGB, and by referencing this kind of color conversion table, it is possible to rapidly convert the RGB image data to the gradation data of each color C, M, Y, and K.

When this color conversion process ends, the CPU 102 of the computer 100 implements halftone processing on the gradation data of each color C, M, Y, and K (FIG. 9, step S210). The halftone processing is the following kind of process. The gradation data obtained by the color conversion process can have the values from gradation value 0 to gradation value 255. In relation to this, the printer displays an image by forming dots, so can only have the status of either having dots formed or not formed for each pixel. In light of this, the gradation data having 256 gradations has to be converted to data expressed by the presence or absence of dot formation for each pixel (dot data). The halftone process is the process of converting data having 256 gradations to dot data in this way.

As a method of performing halftone processing, it is possible to use various methods such as the error diffusion method, the dither method, or the like. The error diffusion method is a method by which by determining the presence or absence of dot formation for a certain pixel, the error of the gradation expression that occurs with that pixel is diffused to the peripheral pixels, and so as to eliminate the diffused error from the peripheral pixels, the presence or absence of dot formation is determined for each pixel. Also, the dither method is a method by which the threshold value set at random in the dither matrix and the gradation value of the printing image data are compared for each pixel, and it is determined that dots are formed at pixels for which the printing image data is larger, and conversely it is determined that dots are not formed for pixels for which the threshold value is larger, and thus the dot data is obtained for each pixel. With the display image printing process of this embodiment, it is possible to perform halftone processing using either method of the error diffusion method or the dither method, but here, described is a case of performing halftone processing using the dither method.

Figure 14:
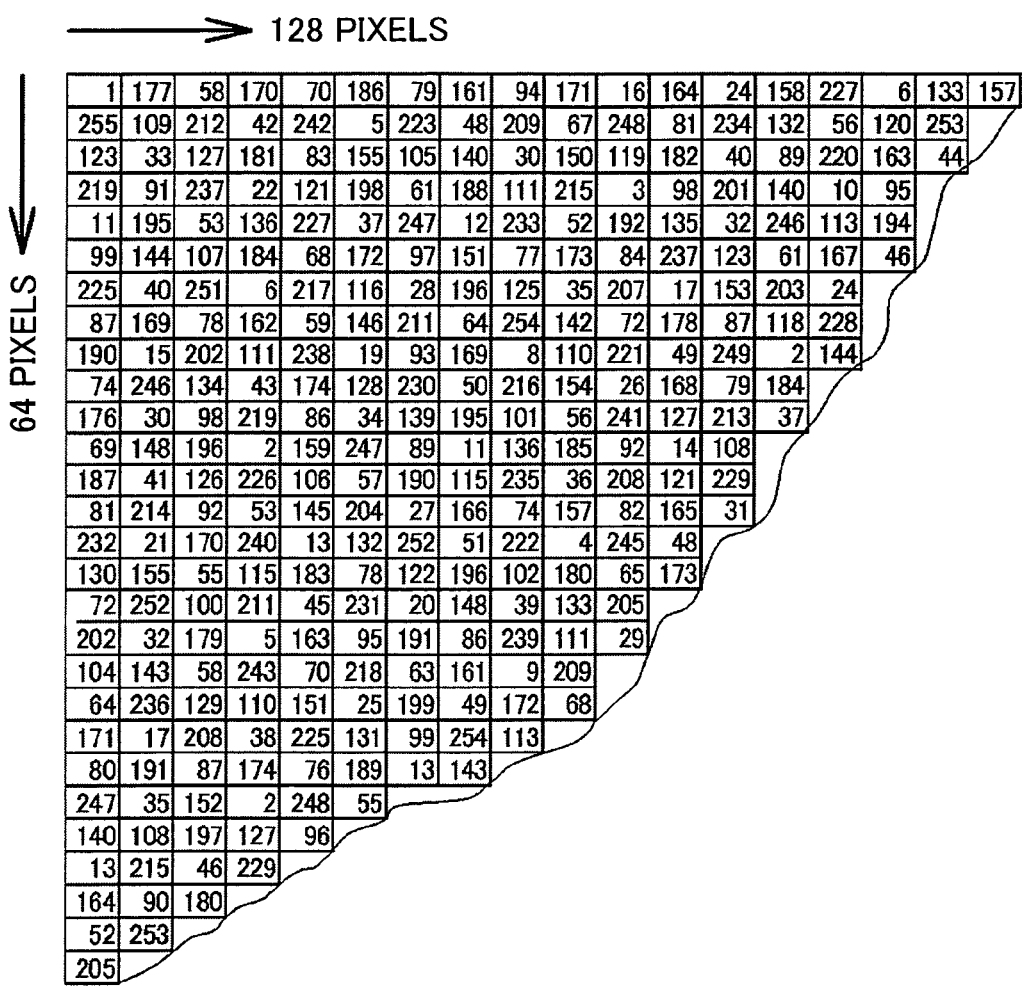
FIG. 14 is an explanatory drawing showing as an example part of a dither matrix in enlarged form.

FIG. 14 is an explanatory drawing that shows an example of part of the dither matrix in enlarged form. In the matrix shown in the drawing are randomly stored threshold values selected thoroughly from the range of gradation values 0 to 255 in a total of 4096 pixels with 64 pixels respectively both vertically and horizontally. Here, the gradation value of the threshold value being selected from the range of 0 to 255 corresponds to the gradation data corresponding to the ink use volume being 1 byte data with this embodiment, and the gradation value that can be allocated to the pixels being a value from 0 to 255. Moreover, the size of the dither matrix is not limited to the vertical and horizontal 64 pixels shown by example in FIG. 14, but can be set to various sizes including ones for which the vertical and horizontal pixel counts differ.

Figure 15:
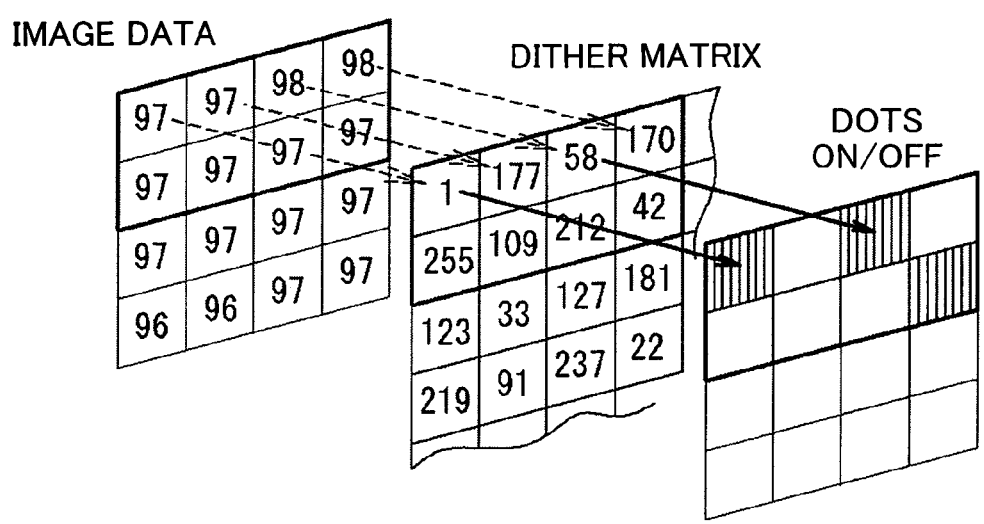
FIG. 15 is an explanatory drawing conceptually showing the status of determining the presence or absence of dot formation for each pixel while referencing the dither matrix.

FIG. 15 is an explanatory drawing that conceptually shows the state of the presence or absence of dot formation for each pixel while referencing the dither matrix. When determining the presence or absence of dot formation, first, the gradation value of the pixel being focused on as the subject of judgment (the pixel of interest) and the threshold value that is stored at a corresponding position in the dither matrix are compared. The thin dotted line arrow shown in the drawing typically represents the comparison of the gradation value of the pixel of interest with the threshold value stored at a corresponding position in the dither matrix. Then, when the gradation value of the pixel of interest is larger than the dither matrix threshold value, that pixel is determined as having dots formed. Conversely, when the dither matrix threshold value is larger, that pixel is determined not to have dots formed.

With the example shown in FIG. 15, the gradation data of the pixel at the upper left corner of the printing image data is a gradation value of 97, and the threshold value stored at the corresponding position to this pixel on the dither matrix is 1. Therefore, for the pixel in the upper left corner, the gradation value 97 of the gradation data is greater than the dither matrix threshold value 1, so it is determined that dots are formed for this pixel. The arrow shown by the solid line in FIG. 15 typically represents the state of this pixel being determined to have dots formed, and the determination results being written to memory. Meanwhile, for the pixel adjacent at right of this pixel, the gradation data gradation value is 97, and the dither matrix threshold value is 177, and the threshold value is greater, so this pixel is determined as not having dots formed. In this way, by comparing the gradation data and the threshold value set in the dither matrix, it is possible to set the presence or absence of dot formation for each pixel.

As described above, at step S210 of the display image printing process shown in FIG. 9, by performing the process described above on the gradation data of each color C, M, Y, and K obtained by the color conversion process, the process of determining the presence or absence of dot formation for each pixel is performed. By performing this kind of halftone process, the gradation data of each color C, M, Y, and K is converted to each color dot data.

Once the halftone process ends, this time, the interlace process starts (step S212). The interlace process is the following kind of process. First, with the halftone process, dot data indicating whether or not dots are formed for each pixel constituting an image is obtained, but this data is data aligned in the pixel sequence. However, as described previously using FIG. 4, nozzles Nz that spray ink drops are provided at intervals of nozzle pitch k in the ink spray heads 244 through 247 of the color printer 200, and since in fact printing is performed with one raster divided a plurality of times, in actuality, the dots are not formed in the pixel sequence. In light of this, a process is needed that, after realigning the dot data considering the sequence in which dots are actually formed by the ink spray head of each color, outputs to the color printer 200 in the sequence in which dots are formed. With the interlace process, the process is performed of realigning the dot data in this way, and outputting the obtained data as printing data to the color printer 200.

Figure 16:
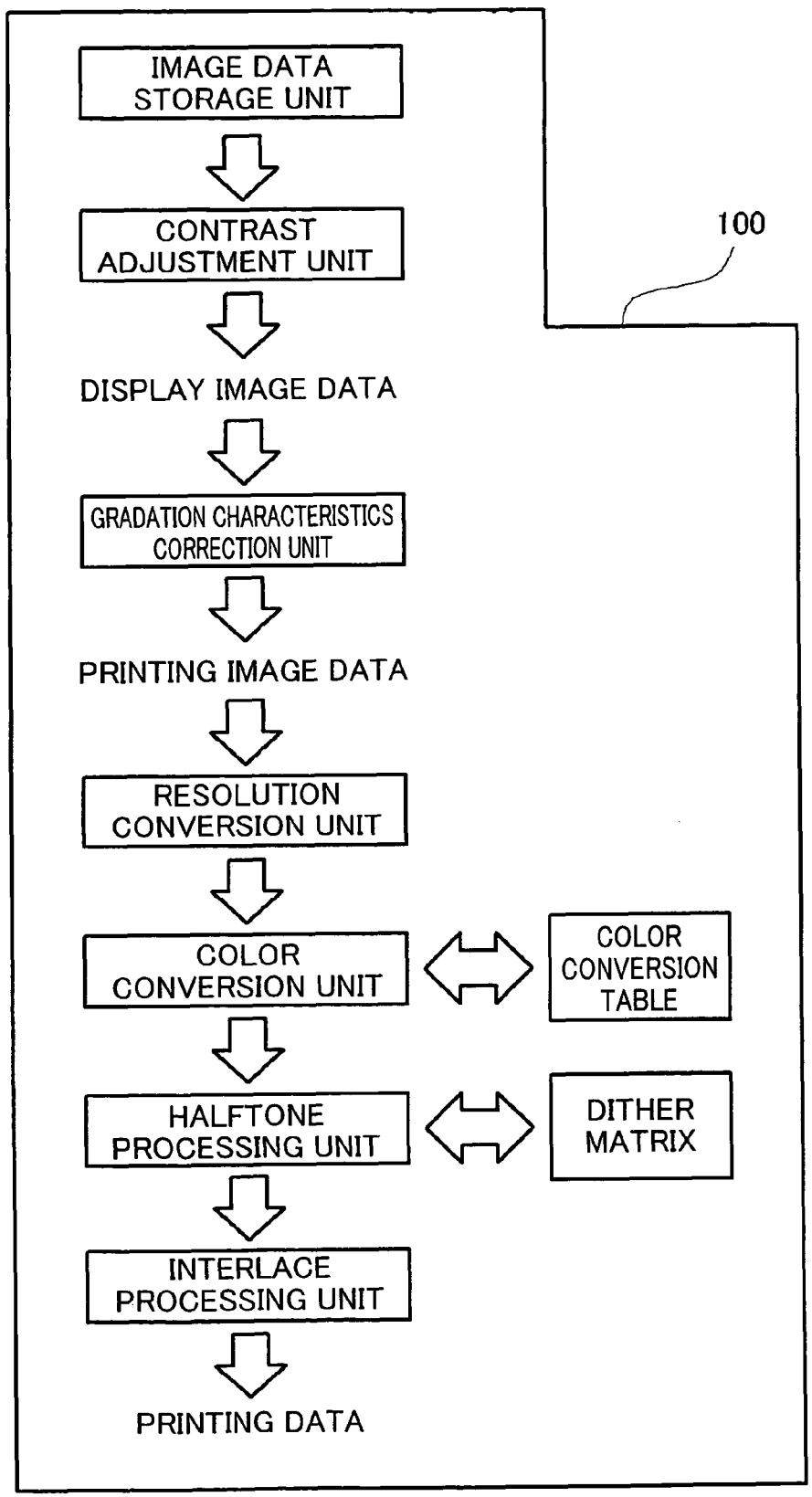
FIG. 16 is a block diagram conceptually showing the status of executing the display image printing process within the computer.

FIG. 16 is a block diagram that conceptually shows the state of the series of display image printing processes described above being performed within the computer 100. The image data read at step S200 of the display image printing process is stored in the "image data storage unit," and next, the gradation value of the image data stored in the image data storage unit is converted and the display image data is generated by the "contrast adjustment unit." The image data storage unit and the contrast adjustment unit are realized mainly by the RAM 106 and the CPU 102. The display image data generated in this way has its gradation characteristics corrected by the "gradation characteristics correction unit" and is converted to printing image data. Next, the respective processes are performed in sequence by the "resolution conversion unit," the "color conversion unit," the "halftone processing unit," and the "interlace processing unit," this is converted to printing data, and output to the color printer 200. These conversion units and processing units are realized mainly by the CPU 102 and the RAM 106.

When the color printer 200 receives the printing data generated in this way by the computer 100, the main scan of the carriage 240 and the sub scan of the printing paper are synchronized according to that printing data, and ink drops are sprayed at a suitable timing (step S214). As a result, ink dots are formed on the printing paper at a suitable distribution, and the image is printed.

With the display image printing process of the first embodiment described above, further gradation characteristics correction is performed on the display image data for which contrast has been adjusted and printing image data is generated, and the image is printed by performing the series of processes on the obtained printing image data. As described previously, the display image data is image data for which the contrast has been adjusted the same as with the image displayed in the monitor, so when the process is performed of doing further gradation characteristics correction on the display image data, the image contrast will be different from the status displayed on the monitor. Regardless of this, as described previously using FIG. 10 and FIG. 11, when characteristics for which the part for which the gradation characteristics conversion curve bottom is convex increases linearly, it is possible to print the image closer to the impression to the image displayed on the monitor.

In this way, the part for which the gradation characteristics conversion curve bottom is convex, specifically, with the part for which the change in brightness displayed on the monitor in relation to the gradation value of the display image data is convex on the bottom, it is not clear at present the reason that a printing image that is closer to the impression of the image displayed on the monitor is obtained more when the contrast is changed so that the brightness increases linearly than when printing an image with exactly the same contrast as the image displayed on the monitor. However, one possible cause is that the mechanism for expressing image or hue is different for the monitor and printing image. Specifically, the monitor itself emits RGB light and expresses color using additive color mixture, and in contrast, the printed image expresses color using subtractive color mixture whereby the ink absorbs specific wavelengths from within the light reflected by the printing paper, and colors are recognized according to the remaining light wavelengths. In this way, since there is a big difference in the mechanism for expressing the image and hue between the monitor and the printing image, it is possible that just because the contrast was made exactly the same, that doesn't mean that the image will be expressed in completely the same way. Considering in this way, for the printing image, the fact that further correcting the contrast that is adjusted when displaying on the monitor according to some reference obtains a printed image closer to the monitor image does not seem strange. Considering this, with the display image printing process of the first embodiment described above, it is possible to consider a method of correcting the printing image to a suitable contrast by a very simple process for which correction of the contrast is done to make the part for which the gradation characteristics conversion curve bottom is convex roughly a straight line.

E. Display Image Printing Process of the Second Embodiment:

With the display image printing process of the first embodiment described above, for the display image data, specifically, the image data for which the contrast is adjusted in the same way as the image displayed on the monitor 114, the gradation value is converted according to the gradation characteristics correction curve shown in FIG. 12, and color conversion processing was performed on the obtained printing image data. However, by setting suitable gradation values in advance in the color conversion table LUT referenced with the color conversion process, it is possible to implement the process of correcting the gradation characteristics and the color conversion process with a single process. Following, this kind of display image printing process of the second embodiment is described.

Figure 17:
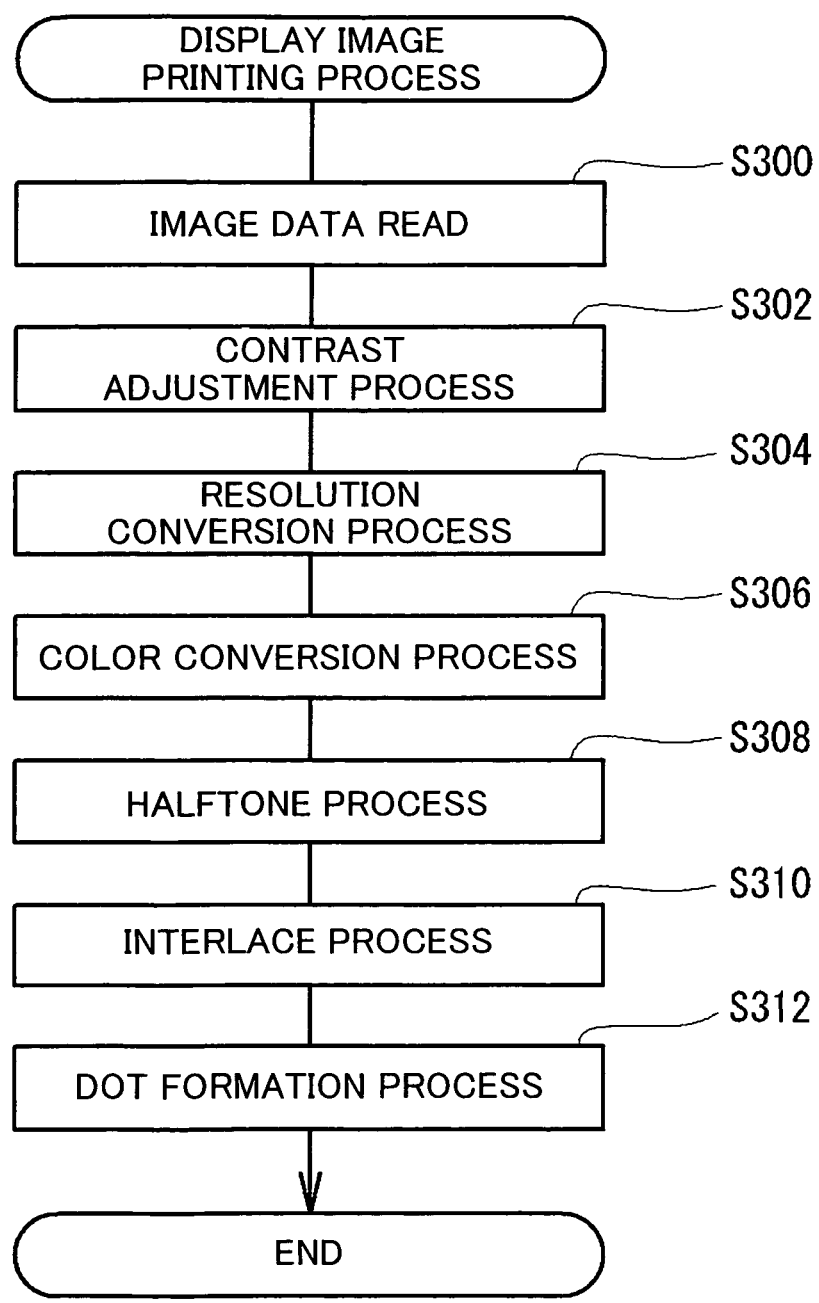
FIG. 17 is a flow chart showing the flow of the display image printing process of the second embodiment.

FIG. 17 is a flow chart showing the flow of the display image printing process of the second embodiment. The same as with the display image printing process of the first embodiment described previously, this process is a process executed by the CPU 102 incorporated in the computer 100. Following, the description is given according to the flow chart.

For the display image printing process of the second embodiment as well, the same as with the first embodiment described previously, first, the image data to be printed is read (step S300), and the process of converting this to display image data by adjusting the contrast of the image data according to the gradation characteristics conversion curve is performed (step S302).

With the display image printing process of the first embodiment described previously, the process of correcting the gradation characteristics was performed by using the gradation characteristics correction curve shown in FIG. 12 on the display image data obtained in this way, but with the display image printing process of the second embodiment, the resolution conversion process starts immediately without correcting the display image data gradation characteristics (step S304). As described previously, the resolution conversion process is a process that converts the image data resolution to the resolution for printing by the color printer 200 (printing resolution).

Then, this time the color conversion process is performed on the display image data for which the resolution was converted (step S306). With the color conversion process, by referencing the kind of color conversion table LUT shown in FIG. 13, the display image data in the RGB image data format is converted to gradation data of each color C, M, Y, and K. Here, as described previously, the gradation data of each color C, M, Y, and K stored at each grid point of the color conversion table LUT referenced with the first embodiment has the hues expressed by the RGB coordinate values of the grid points become the gradation data expressed using each color of ink incorporated in the color printer 200. Specifically, with the color conversion table referenced with the first embodiment, the hue expressed by the RGB coordinate values of the grid points and the hues expressed by the gradation data of each color CMYK stored at the grid points represented the same hues.

In contrast to this, with the color conversion table referenced with the color conversion process of the second embodiment (step S306), the hues expressed by the RGB coordinate values of the grid points and the hues expressed by the gradation data of each color CMYK stored in the grid points are not expressions of the same hues. This is described in detail later, but the color conversion table referenced with the second embodiment is a table for which the RGB coordinate values of each grid point are converted according to the gradation characteristics correction curve shown by the solid line in FIG. 12, and the table stores gradation data for which the hues represented by the RGB coordinate values after conversion are expressed by each color CMYK. The method for setting this kind of color conversion table referenced with the second embodiment is described in detail using a separate drawing.

At step S306 of the display image printing process of the second embodiment shown in FIG. 17, by performing the color conversion process of the display image data while referencing this kind of color conversion table, the process of converting the display image data expressed by the gradation values of each color RGB to printing image data expressed by the gradation values of each color C, M, Y, and K is performed.

In this way, once the printing image data expressed by each color C, M, Y, and K is obtained in this way, the CPU 102 of the computer 100 performs halftone processing, and the printing image data is converted to dot data of each color C, M, Y, and K (data expressed by the presence or absence of dot formation for each pixel) (FIG. 17, step S308). Next, by performing the interlace process described previously, printing data is generated for which the dot data is realigned considering the sequence in which the dots are actually formed by the ink spray head, and the obtained printing data is output to the color printer (step S310). When the color printer 200 receives printing data supplied from the computer 100, ink dots are sprayed according to the printing data and dots are formed on the printing paper (step S312). As a result, an image is printed on the printing paper.

Figure 18:
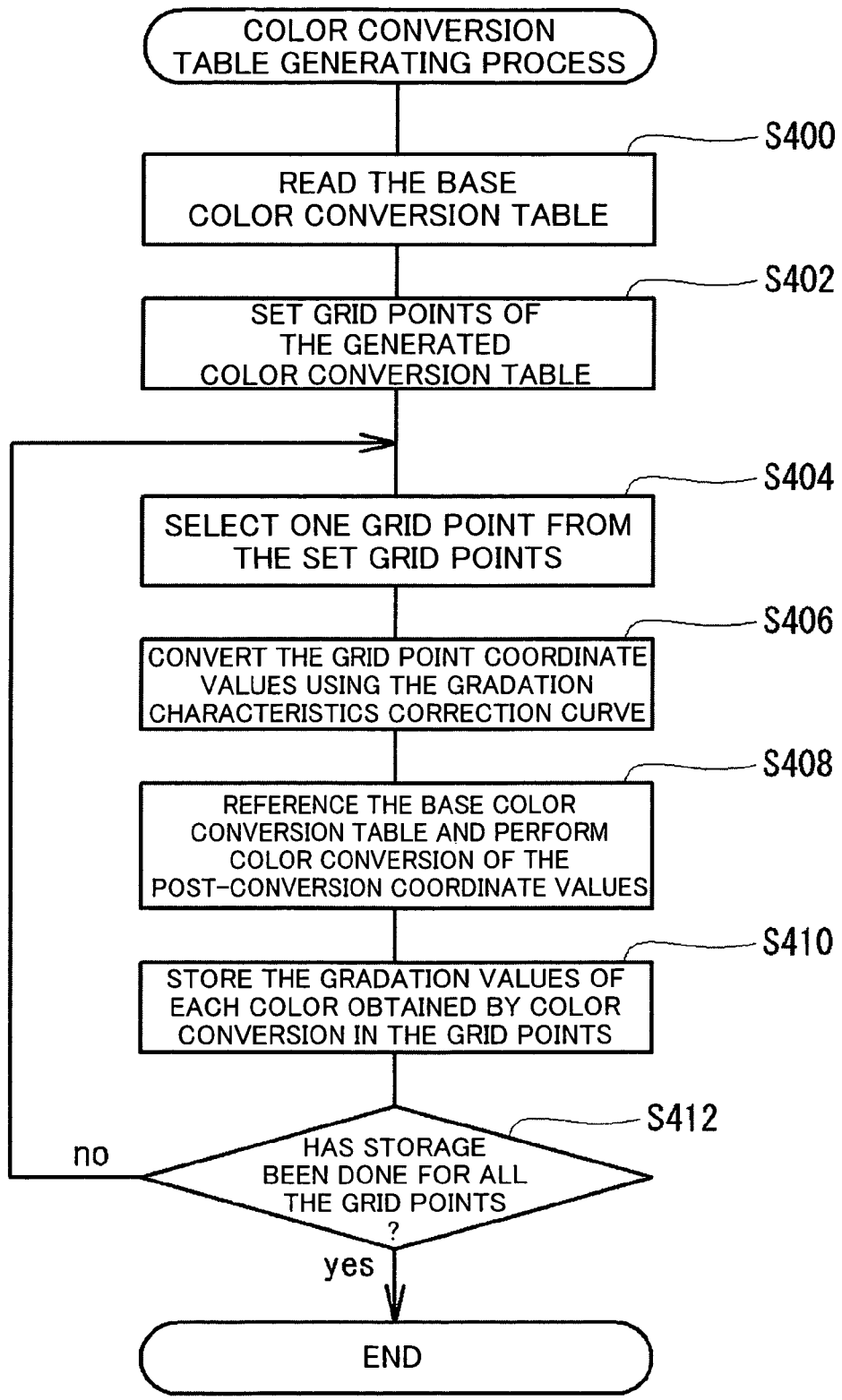
FIG. 18 is a flow chart showing the flow of the process of generating the color conversion table referenced with the second embodiment.

Here, described is a method of generating the color conversion table LUT referenced with the display image printing process of the second embodiment described above. FIG. 18 is a flow chart that shows the flow of the method of generating the color conversion table LUT referenced with the second embodiment. Following is a description according to the flow chart.

When generating the color conversion table referenced with the second embodiment, first, the color conversion table LUT that is the base is read (step S400). Here, the color conversion table LUT that is the base means the color conversion table referenced with the first embodiment described previously, specifically, the kind of color conversion table for which the hues expressed by the RGB coordinate values of each grid point and the hues expressed by the gradation data of each color CMYK stored in each grid point represent the same hues.

Next, the grid points of the color conversion table to be generated are set (step S402). The grid points of the color conversion table LUT can be easily set by dividing each RGB axis at suitable intervals, for example.

Once a plurality of grid points are set in this way, gradation values of each color C, M, Y, and K are stored for each respective grid point. Specifically, first, one grid point to be the subject is selected (step S404). Then, the RGB coordinate values of the grid point is converted according to the gradation characteristics correction curve shown by the solid line in FIG. 12 (step S406). The new RGB coordinate values obtained in this way become the coordinate values for which the gradation characteristics correction process of the first embodiment (FIG. 9, step S204) is performed on the original RGB coordinate values.

Next, the new RGB coordinate values are read in place of the RGB image data, and the color conversion process is performed on this RGB image data (FIG. 18, step S408). If the color conversion table LUT that is the base that was read in advance at step S400 is referenced, it is easy to do color conversion of the RGB image data. In this way, the gradation values of each color obtained by doing color conversion of the new RGB coordinate values are stored at the grid points selected as the subject (step S410).

Once the gradation value of each color is stored at one grid point by operating as described above, a determination is made of whether or not gradation values are stored at all the grid points that were set (step S412). Then, when it is determined that there are grid points for which gradation values have still not been stored (step S412: no), the process returns to step S404, and after a new grid point is selected from among the plurality of grid points, the subsequent series of processes described above is performed. This kind of process is repeated, and when it is determined that gradation values of each color have been stored for all the grid points (step S412: yes), then a new color conversion table LUT has been generated, and the color conversion table generating process shown in FIG. 18 ends.

With the display image printing process of the second embodiment described previously using FIG. 17, by referencing the color conversion table generated as described above, color conversion of the display image data is performed. To do this, the process of correcting the gradation characteristics of the image data and the color conversion process are performed simultaneously, so it is possible to generate the printing image data rapidly, and thus it is possible to rapidly print an image for which the impression is closer to the image displayed in the monitor.

F. Variation Examples:

Also, there are various variation examples for the display image printing process of the first embodiment and the second embodiment described above. Following are simple descriptions of these variation examples.

With each embodiment described above, when the image data is read, by performing the process of adjusting the contrast, the display image data is converted once. Then, with the first embodiment, after further correcting the gradation characteristics for the display image data, color conversion processing was performed. Also, with the second embodiment, by referencing a color conversion table for which the gradation characteristics are corrected in advance, correction of the gradation characteristics was performed simultaneously with color conversion of the display image data. In comparison to this, it is also possible to not do conversion once on the display image data for which the contrast of the read image data has been adjusted, and rather to immediately convert to the printing image data.

Specifically, with the first embodiment described previously, the gradation values of the read image data are converted according to the gradation characteristics conversion curve shown by the dotted lines in FIG. 10 to generate the display image data, and next, by converting the gradation values of the display image data according to the gradation characteristics shown by the solid line in FIG. 12, the printing image data was generated. Here, the gradation characteristics correction curve shown in FIG. 12 is for converting the gradation characteristics shown by the dotted line in FIG. 10 to the gradation characteristics shown by the solid line, so if the gradation values of the read image data are converted according to the gradation characteristics conversion curve shown by the solid line in FIG. 10, it is possible to immediately generate printing image data. In this way, it is possible to have the read image data immediately converted to printing image data, and next, to perform color conversion on this printing image data.

Alternatively, with the second embodiment, after the contrast of the read image data is adjusted and this is converted to display image data, by doing color conversion by referencing the color conversion table for which the gradation characteristics are corrected in advance, color converted printing image data was generated immediately. Here, if a color conversion table is generated in advance for which not just gradation characteristics correction but also contrast adjustment was performed, and this color conversion table is referenced to do color conversion, it is possible to immediately convert the read image data to color converted printing image data.

Specifically, at step S406 of the color conversion table generating process shown in FIG. 18, the RGB coordinate values of the grid points were converted using the gradation characteristics correction curve shown by the solid line in FIG. 12, but instead of the gradation characteristics correction curve, it is also possible to convert the coordinate values of the grid points using the gradation characteristics curve shown by the solid line in FIG. 10. The new RGB coordinate values obtained in this way are coordinate values for which the first embodiment contrast adjustment process (FIG. 9, step S202) and the gradation characteristics correction process (FIG. 9, step S204) have been performed on the original RGB coordinate values. Next, the new RGB coordinate values are read in place of the RGB image data, and after performing the color conversion process on this RGB image data, the obtained gradation values of each color can be stored in the grid points. If color conversion is performed by referencing a color conversion table generated in this way, it is possible to immediately convert the read image data to the color converted printing image data.

As described above, if the read image data is converted immediately to the printing image data without once converting to display image data for which the contrast has been adjusted, it is possible to rapidly generate printing image data, and thus to print images rapidly, which is desirable.

Above, various embodiments were described, but the present invention is not limited to the embodiments described above, and can be implemented with various aspects in a scope that does not stray from the main idea. For example, with the first embodiment, the horizontal axis is used for the gradation values of the display image data, and the vertical axis is used for the output brightness that is the brightness of the image displayed on the screen by the display image data having that gradation value, and when that output brightness is changed for expression of the gradation values of that display image data, the area for which the graph representing the changes has the horizontal axis direction convex was detected as the gradation area, but it is also possible to detect this as the area for which the relationship of the output brightness that is the brightness of the image displayed on the screen by the display image data and the display image data having this gradation value be such that the output brightness for the gradation value of the display image data is adjusted to be smaller than a directly proportional relationship. It is also possible to specify whether or not the bottom is convex or not from the graph inflection point or the like.

What is claimed is:

1. A printing device for printing images with ink, comprising:
   a printing mechanism that applies ink onto a recording medium for printing;
   an image data input unit that inputs original image data;
   a display image data conversion unit that converts the input image data into display image data for displaying an image of specified gradation values on a screen using bright spots;
   a printing image data generating unit that, in a particular range, by shifting the gradation value of the display image data so as to have a linear relationship between the gradation value and the output brightness, generates printing image data from the display image data; and
   a printing unit that controls the printing mechanism according to the generated printing image data,
   wherein the particular range is a range where a relationship between the gradation value of the display image data and an output brightness defined as a brightness of an image displayed on the screen based on the display image data is adjusted so that the output brightness is smaller than the gradation value of the display image data in direct proportion to the gradation value of the display image data,
   wherein the printing mechanism prints images using a plurality of types of ink that are different colors, and the printing image data generating unit generates the printing image data by shifting the gradation values of the display image data and converting the shifted display image data to image data expressed by the gradation values of each type of the ink, and
   wherein the printing image data generating unit comprises:
   a correspondence table in which is stored the correlation of the gradation values of the display image data and combinations of the gradation values of each of the types of ink, the gradation values of the display image data shifted, and the table storing the gradation values of each type of the inks for expressing the corrected display image data; and
   a unit that references the correspondence table and generates the printing image data from the display image data.

2. A printing method comprising:
   inputting, with an image data input unit, original image data;
   converting, with a display image data conversion unit, the input image data into display image data that displays images of a specified gradation values on the screen using bright spots;
   generating, with a printing image data generating unit, printing image data from the display image data, in a particular range, by shifting the gradation value of the display image data so as to have a linear relationship between the gradation value and the output brightness;
   controlling a printing mechanism that prints images with ink according to the generated printing image data;
   storing in a correspondence table a correlation of the gradation values of the display image data and combinations of the gradation values of each of types of ink, the gradation values of the display image data shifted, and storing in the correspondence table the gradation values of each type of the inks for expressing the corrected display image data; and
   referencing the correspondence table and generating the printing image data from the display image data,
   wherein the particular range is a range where a relationship between the gradation value of the display image data and an output brightness defined as a brightness of an image displayed on the screen based on the display image data is adjusted so that the output brightness is smaller than the gradation value of the display image data in direct proportion to the gradation value of the display image data, and
   wherein the printing mechanism prints images using a plurality of types of ink that are different colors, and the printing image data generating unit generates the printing image data by shifting the gradation values of the display image data and converting the shifted display image data to image data expressed by the gradation values of each type of the ink.

3. A non-transitory computer readable medium having stored therein a program for making a computer execute an image processing method that generates printing image data for printing with ink, the program including computer executable instructions for performing steps comprising:

a first function that inputs original image data;

a second function that converts input image data into display image data that displays images of a specified gradation values on the screen using bright spots;

a third function that generates printing image data from the display image data, in a particular range, by shifting the gradation value of the display image data so as to have a linear relationship between the gradation value and the output brightness;

a fourth function that stores in a table a correlation of the gradation values of the display image data and combinations of the gradation values of each of types of ink, the gradation values of the display image data shifted, and stores in the table the gradation values of each type of the inks for expressing the corrected display image data; and a fifth function that references the table and generates the printing image data from the display image data, wherein the particular range is a range where a relationship between the gradation value of the display image data and an output brightness defined as a brightness of an image displayed on the screen based on the display image data is adjusted so that the output brightness is smaller than the gradation value of the display image data in direct proportion to the gradation value of the display image data, and wherein images are printed using a plurality of types of ink that are different colors, and the printing image data is generated by shifting the gradation values of the display image data and converting the shifted display image data to image data expressed by the gradation values of each type of the ink.

4. The non-transitory computer readable medium having stored therein a program as defined in claim 3, the program further comprising:

a sixth function of controlling a printing mechanism that prints images with ink according to the generated printing image data.

5. A non-transitory computer readable medium having stored therein a program for making a computer execute a method that generates a conversion table for which the image data according to a first colorimetric system for displaying images on a screen and image data according to a second colorimetric system for printing the images are correlated and stored, and that is referenced to convert display image data according to the first colorimetric system for which specified gradation conversion has been performed to display the images on the screen to image data of the second colorimetric system, the program including computer executable instructions for performing steps comprising:

a first step that sets a plurality of image data of the first colorimetric system stored in the conversion table;

a second step that generates converted image data by converting the gradation values of the set first colorimetric system image data;

a third step that, after color converting the converted image data according to the first colorimetric system to image data according to the second colorimetric system, correlates the obtained second colorimetric system image data to the set first colorimetric system image data and stores the obtained second colorimetric system image data in the conversion table;

a fourth step that stores in a correlation table a correlation of the gradation values of the image data according to a first colorimetric system and combinations of the gradation values of each of types of ink, the gradation values of the image data according to a first colorimetric system shifted, and stores in the correlation table the gradation values of each type of the inks for expressing the corrected image data according to a first colorimetric system; and a fifth step that references the correlation table and generates the printing image data from the display image data;

the second step including: generating printing image data from the display image data, in a particular range, by shifting the gradation value of the display image data so as to have a linear relationship between the gradation value and the output brightness, wherein the particular range is a range where a relationship between the gradation value of the display image data and an output brightness defined as a brightness of an image displayed on the screen based on the display image data is adjusted so that the output brightness is smaller than the gradation value of the display image data in direct proportion to the gradation value of the display image data, and wherein images are printed using a plurality of types of ink that are different colors, and the printing image data is generated by shifting the gradation values of the display image data and converting the shifted display image data to image data expressed by the gradation values of each type of the ink.

* * * * *